(12) United States Patent
O'Malley

(10) Patent No.: US 10,061,839 B2
(45) Date of Patent: Aug. 28, 2018

(54) CLASSIFYING, TAGGING, AND SEARCHING DATA, INFORMATION, CONTENT, AND IMAGES

(71) Applicant: Matt O'Malley, Lake Balboa, CA (US)

(72) Inventor: Matt O'Malley, Lake Balboa, CA (US)

(*) Notice: Subject to any disclaimer, the term of this patent is extended or adjusted under 35 U.S.C. 154(b) by 0 days.

(21) Appl. No.: 14/796,794

(22) Filed: Jul. 10, 2015

(65) Prior Publication Data

US 2015/0317382 A1  Nov. 5, 2015

Related U.S. Application Data

(62) Division of application No. 13/481,953, filed on May 28, 2012, now abandoned, which is a division of application No. 11/611,846, filed on Dec. 15, 2006, now Pat. No. 8,224,816.

(51) Int. Cl.
*G06F 17/30* (2006.01)
*H04L 29/08* (2006.01)

(52) U.S. Cl.
CPC .... *G06F 17/30598* (2013.01); *G06F 17/3089* (2013.01); *G06F 17/30312* (2013.01); *G06F 17/30876* (2013.01); *G06F 17/30893* (2013.01); *H04L 67/02* (2013.01); *H04L 67/26* (2013.01)

(58) Field of Classification Search
CPC .......... G06F 17/30876; G06F 17/3089; G06F 17/30893; G06F 17/30598; G06F 17/30312; H04L 67/26; H04L 67/02
See application file for complete search history.

(56) References Cited

U.S. PATENT DOCUMENTS

| | | | |
|---|---|---|---|
| 7,975,020 B1* | 7/2011 | Green | G06Q 30/0241 705/14.4 |
| 2007/0179835 A1* | 8/2007 | Ott, IV | G06Q 30/02 705/306 |
| 2008/0091509 A1* | 4/2008 | Campbell | G06Q 30/02 705/12 |
| 2008/0134053 A1* | 6/2008 | Fischer | G06Q 10/02 715/747 |

* cited by examiner

*Primary Examiner* — Cheikh Ndiaye

(57) ABSTRACT

A system and a computer-implemented method of gathering data on at least one website is provided where by placing a tracking overlay on a website, the tracking overlay operates independently from any concurrently active program, appearing concurrently within a user interface, allowing for work with said concurrently active program. The work including capturing data within said tracking overlay, including a plurality of identifying markers of said data from the website; and storing the data, including said plurality of identifying markers within at least one database. The stored data includes classifying the data and images with tags and meta-data.

20 Claims, 13 Drawing Sheets

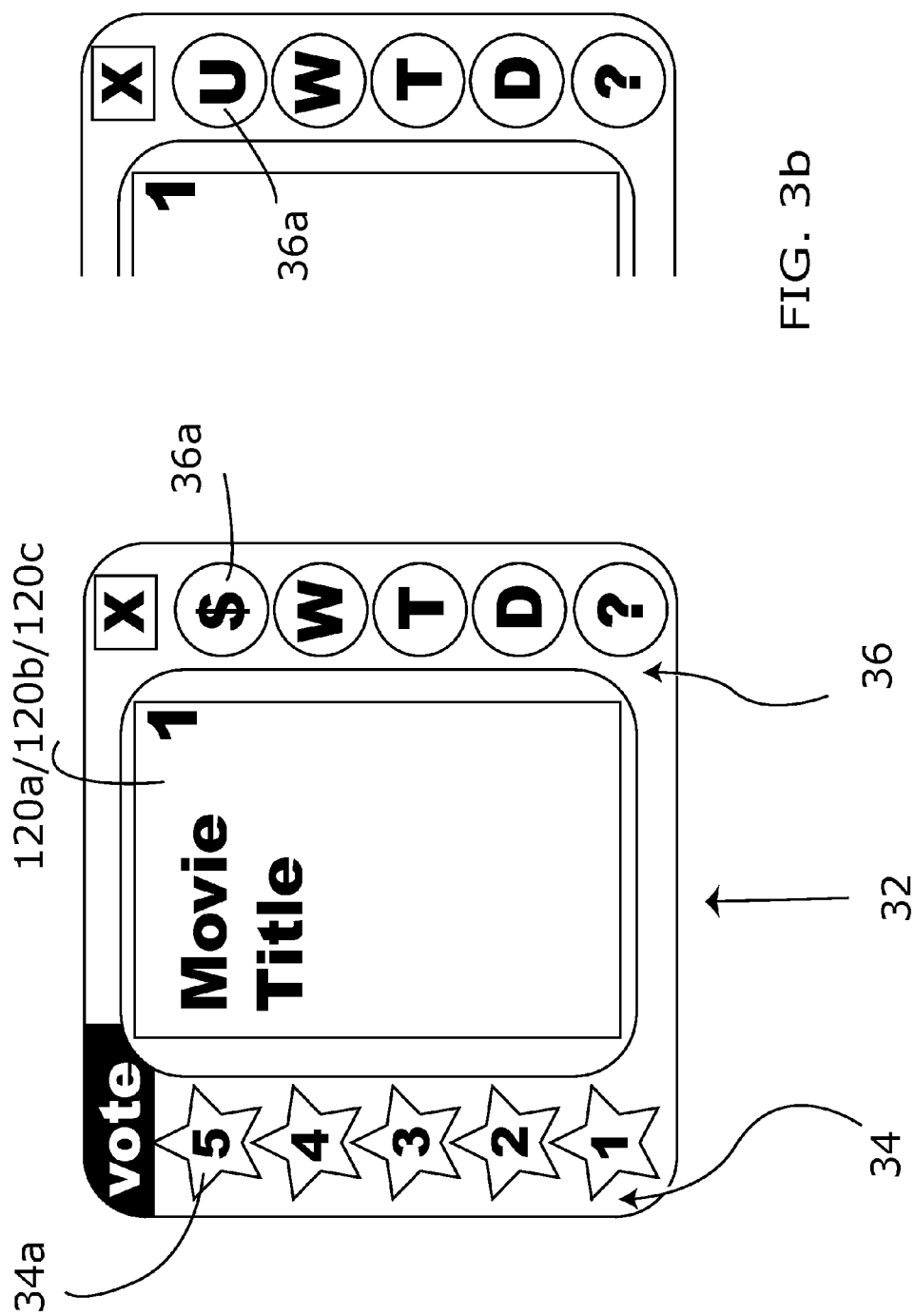

FIG. 5

CLASSIFYING, TAGGING, AND SEARCHING DATA, INFORMATION, CONTENT, AND IMAGES

BENEFIT CLAIMS

This application is a divisional and claims benefit and priority from prior applications, a U.S. patent application Ser. No. 13/481,953, entitled "PROFILE BASED SEARCHING AND TARGETING," filed on May 28, 2012, the disclosure of which is hereby incorporated by reference in its entirety and is still pending, where all applications claim priority to a non-provisional application filed Dec. 15, 2006, entitled "SYSTEM AND METHOD FOR SEGMENTING INFORMATION," with U.S. patent application Ser. No. 11/611,846, the disclosure of which is hereby incorporated by reference in its entirety, that was published Jul. 3, 2008, and that was granted on Jul. 17, 2012, U.S. Pat. No. 8,224,816.

BACKGROUND

1) Field of the Invention

The invention relates generally to information retrieval systems, more particularly, a system, a method and a computer readable medium for segmenting information.

2) Discussion of the Related Art

Millions of people currently access the Internet on a daily basis to search and shop for goods and services, find information, and to communicate with friends, family, and others who may or may not have like-minded interests. When a consumer wishes to purchase a product or find information on the Internet, the consumer enters an address into a web browser of a website associated with the product, service or information. If the consumer is not aware of a website associated with the product or service, the consumer may search using a search engine.

Search engines are a powerful resource. Several search engines exist that facilitate the searching of information from different information sources. For example, Google® and Yahoo® are both commonly used search engines that search information on the World Wide Web. When a user or consumer is seeking products, services or information, the user will enter text or a string of text relevant to the information sought. The user then receives a number of results or "hits" based on the search query.

The user is generally able to search within the first search and narrow down results by clicking an option to search within results. In addition, the user may assign certain filtering parameters to the search. The filtering may be absolute or relative. The net results are then listed, often in order of relevance by a predetermined algorithm. The user is then presented with a large number of websites in which the user must navigate and determine, of the websites, which is the most valuable to the user's interests. The sheer number of websites presented to the user is a deterrent from finding a site that is uniquely tailored to the user's interests. Moreover, search engines rarely ask any uniquely identifying information which would function to distinguish the user. Essentially, the query itself is the only distinguishing feature.

After a user purchases a product found on a website, or a consumer enters a search query using a search engine, where the usage is tracked, a subsequent visit may bring up suggestions of other products that other users have bought, who also bought the first product, or searched using the same previously submitted search queries. Currently, Amazon-.com® provides a "suggestion engine", i.e. "people who bought this book also bought that book." While this is a great feature, there are many disadvantages. Suggestion engines will use other customer's usage habits as a base to recommend products. The suggestion is inefficient because the suggested product is based on low correlating data, i.e. the fact(s) that both had previously purchased the same product(s), or used the same search terms in a search. Without more data on both users, the probability that the user will actually benefit from the suggestion is relatively low.

The power of the suggestion becomes even more attenuated when the data used in the suggestion may have been based on a user buying for a family member or friend, an item that may have been a gag gift, resulting in a suggestion tailored for a completely different purpose. Compounding further, current suggestion engines are unable to gather the necessary data to tailor the suggestion. This is because, given the state of the art, users are unwilling to spend the time necessary to enter the appropriate data into the system.

A user using a search engine, such as Google®, is faced with other disadvantages as well. Currently, search engines allow the user the ability to enter a search query and receive results. However, if the user wanted to modify search parameters and visualize the distinctions between, and effect of, each parameter, the user would be unable to do so without having to start each search over, thus requiring the user to enter text separately, tracking each query and result.

Currently, the art does not have the ability to provide tailored information to users and functionality to searching. What is needed is a way to segment searched information so it can be categorized, such as segment like-minded interests and traits; segment products, items, places, services, websites, and people; segment information and search formats such as text, video, audio, images, and combinations of format types; segment marketing campaigns by their appeal or success; and segment individual words, terms, concepts, or categories used in a text, audio, and/or video search. Further needed are ways to compare and correlate these segments.

BRIEF DESCRIPTION OF THE DRAWINGS

FIG. 3a illustrates a tracking overlay, including a rating panel with a plurality of rating factors and a selecting panel with a plurality of commands.

FIG. 3b illustrates a tracking overlay, including an undo feature as a command.

FIG. 5 illustrates a web screen of an at least one profile, including management of an at least one profile.

SUMMARY

Figure 1:
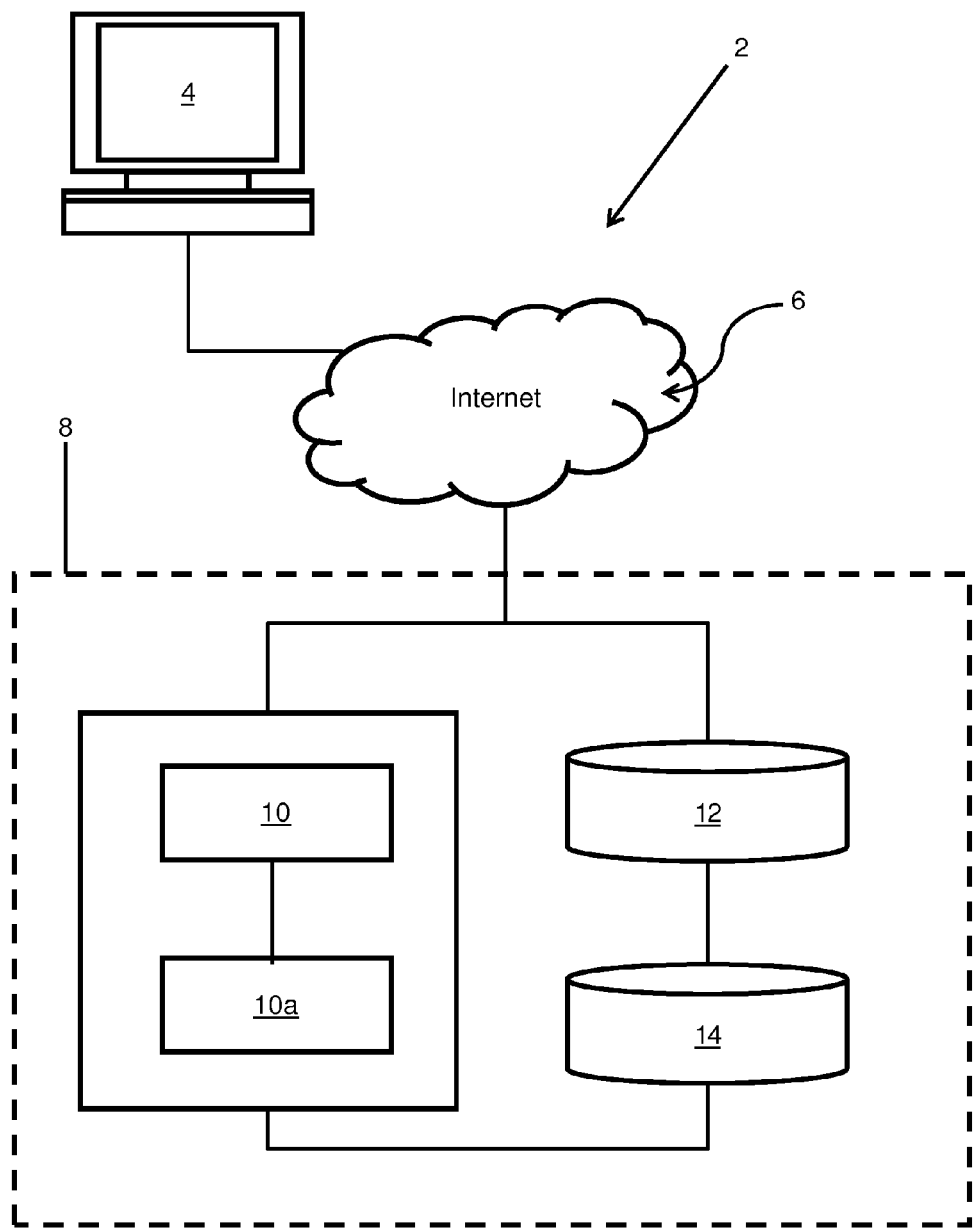
FIG. 1 of the accompanying drawings illustrates an information retrieval client-server network.

In a first embodiment, a method of segmenting information comprises the displaying of a topic list; selecting a topic from the topic list, including a question indicative of the topic; selecting the question, including a plurality of response forms; selecting a response form; and displaying a correlated content to the response form, Further, wherein the method may include selecting a filter from a plurality of filters; displaying a correlated content, opposite to the correlated content to the response form; while providing an option to remove the a question from the selected response form; and providing an option to switch the response form. Furthermore, wherein the option to switch includes the correlated content.

The method may also include displaying a correlated content to the response form according to a priority and a tracking overlay, the tracking overlay comprised of a rating panel, including a plurality of rating factors, and a selecting panel, including a plurality of commands, sorting of the correlated content to the response and generating a correlated content. Further, wherein the sorting correlated content increases content value. Furthermore, wherein in the sorting of correlated content, optionally, disposes the correlated content from the displaying of correlated content, including an opposite correlated content. The method may also include managing an at least one user profile, including comparing the at least one profile with a correlated content. Further, wherein the at least one user profile is associated with a coding scheme. The method may include at least one collaborative component and display a public content.

In a second embodiment, a method of segmenting information comprises displaying a pre-generated compounded topic generated from a correlated content; selecting a pre-generated compounded topic; and displaying the correlated content. Further, including selecting an at least one filter of a plurality of filters and displaying a correlated content, opposite to the correlated content to the response form, displaying a correlated content to the response form according to a priority; and including a tracking overlay comprised of a rating panel, including a plurality of rating factors, and a selecting panel, including a plurality of commands, sorting of the correlated content to the response and generating a correlated content. Further, wherein the sorting correlated content increases content value and wherein in the sorting of correlated content, optionally, disposes the correlated content from the displaying of correlated content, including an opposite correlated content.

The method also includes the managing an at least one user profile, including comparing the at least one profile with a correlated content and wherein the at least one user profile is associated with a coding scheme. The method may include at least one collaborative component and display a public content.

In a third embodiment, a computer implemented system configured to segment information comprises at least one server computer for communicating with a at least one client computer that comprises a means for displaying a topic list; a means for selecting a topic from the topic list, including a question indicative of the topic; a means for selecting the question, including a plurality of response forms; a means for selecting a response form; and a means for displaying a correlated content to the response form. Further, this computer implemented system may include selecting an filter from a plurality of filters. The computer implemented system may include displaying a correlated content, opposite to the correlated content to the response form. The computer implemented system may include providing an option to remove the question from the selected response form of the question and may provide an option to switch the response form, wherein the option to switch includes the correlated content. The computer implemented system may also include displaying a correlated content to the response form according to a priority, and include a tracking overlay comprised of a rating panel, including a plurality of rating factors, and a selecting panel, including a plurality of commands, sorting of the correlated content to the response and generating a correlated content. Further, wherein the sorting correlated content increases content value and wherein in the sorting of correlated content, optionally, disposes the correlated content from the displaying of correlated content, including a opposite correlated content. The means for managing one user profile, may include comparing the one profile with a correlated content and wherein the one user profile may be associated with a coding scheme. The computer implemented system may include at least one collaborative component and may include displaying a public content.

In a fourth embodiment, a computer implemented system configured to segment information, comprising at least one server computer for communicating with a at least one client computer, comprises a means for displaying a at least one pre-generated compounded topic, the at least one pre-generated compounded topic generated from a correlated content; a means for selecting a pre-generated compounded topic; and a means for displaying the correlated content. The computer implemented system may include selecting an at least one filter of a plurality of filters; include displaying a correlated content, opposite to the correlated content to the response form; and include displaying a correlated content to the response form according to a priority. The computer implemented system may include a tracking overlay comprised of a rating panel, including a plurality of rating factors, and a selecting panel, including a plurality of commands, sorting of the correlated content to the response and generating a correlated content. Further, wherein the sorting correlated content increases content value and wherein in the sorting of correlated content, optionally, disposes the correlated content from the displaying of correlated content, including a opposite correlated content.

The computer implemented system may include a means for managing an at least one user profile, including comparing the at least one profile with a correlated content and wherein the at least one user profile is associated with a coding scheme. Further, the computer implemented system may include at least one collaborative component and may include displaying a public content.

In a fifth embodiment, a computer readable medium containing instructions and embodied on a tangible medium for controlling a computer, including a memory and at least one processor to perform a method of segmenting information, the method comprises displaying and selecting a at least one topic from the at least one topic list, including a question indicative of the topic; selecting the question, including a plurality of response forms; selecting a response form; and displaying a correlated content to the response form. This computer readable medium may include selecting an at least one filter of a plurality of filters; include displaying a correlated content, opposite to the correlated content to the response form; and may provide an option to remove the at least one question from the selecting a response form of the at least one question.

The computer readable medium may provide an option to switch the response form; wherein the option to switch includes the correlated content; and may include displaying a correlated content to the response form according to a priority. Further, the computer readable medium may include a tracking overlay, the tracking overlay comprised of a rating panel, including a plurality of rating factors, and a selecting panel, including a plurality of commands, sorting of the correlated content to the response and generating a correlated content, wherein the sorting correlated content increases content value. Further, wherein in the sorting of correlated content, optionally, disposes the correlated content from the displaying of correlated content, including a opposite correlated content.

The computer readable medium may include managing an at least one user profile, including comparing the at least one profile with a correlated content; wherein the at least one user profile is associated with a coding scheme. The computer readable medium of claim may include at least one collaborative component and may include displaying a public content.

In a sixth embodiment, a computer readable medium containing instructions and stored on a tangible medium for controlling a computer, including a memory and at least one processor to perform a method of segmenting information, the method comprises displaying and selecting a pre-generated compounded topic generated from a correlated content; and displaying the correlated content. The computer readable medium may include selecting a filter from a plurality of filters and may include displaying a correlated content, opposite to the correlated content to the response form. The computer readable medium may include displaying a correlated content to the response form according to a priority.

The computer readable medium may include a tracking overlay comprised of a rating panel, including a plurality of rating factors, and a selecting panel, including a plurality of commands, sorting of the correlated content to the response and generating a correlated content; and wherein the sorting correlated content increases content value. Further, wherein in the sorting of correlated content, optionally, disposes the correlated content from the displaying of correlated content, including a opposite correlated content. The computer readable medium may include managing an at least one user profile, including comparing the at least one profile with a correlated content. Further, wherein the at least one user profile is associated with a coding scheme and may include at least one collaborative component and include displaying a public content.

In a seventh embodiment, a method of gathering data on at least one website, comprises placing a tracking overlay over data on at least one website, the tracking overlay operating independently from any concurrently active program, appearing concurrently within a user interface, allowing the user to work with the concurrently active program; capturing the data within the tracking overlay, including a plurality of identifying markers of the data from the at least one website; and storing the data, including the plurality of identifying markers within at least one database. Further, wherein the tracking overlay is comprised of a rating panel, including a plurality of rating factors, and a selecting panel, including a plurality of commands, sorting the data.

In an eighth embodiment, a computer implemented system provides gathering data on at least one website, the system comprising at least one server computer for communicating with a at least one client computer, and comprises a means for placing a tracking overlay over data on at least one website, the tracking overlay operating independently from any concurrently active program, appearing concurrently within a user interface, allowing the user to work with the concurrently active program; a means for capturing the data within the tracking overlay, including a plurality of identifying markers of the data from the at least one website; and a means for storing the data, including the plurality of identifying markers within at least one database. Further, wherein the tracking overlay is comprised of a rating panel, including a plurality of rating factors, and a selecting panel, including a plurality of commands, sorting the data.

In a ninth embodiment, a computer readable medium containing instructions and stored on a tangible medium for controlling a computer, which includes a memory and at least one processor, to perform a method of gathering data on at least one website, comprises placing a tracking overlay over data on at least one website, the tracking overlay operating independently from any concurrently active program, appearing concurrently within a user interface, allowing the user to work with the concurrently active program; capturing the data within the tracking overlay, including a plurality of identifying markers of the data from the at least one website; and storing the data, including the plurality of identifying markers within at least one database. Further, wherein the tracking overlay is comprised of a rating panel, including a plurality of rating factors, and a selecting panel, including a plurality of commands, sorting the data.

In a tenth embodiment, the system displays a prompt and a plurality of responses to a first user, receives a first chosen response selected from said plurality of responses from said first user, displays said prompt and said plurality of responses to a second user, receives a second chosen response selected from said plurality of responses from said second user, and displays a content to said second user based on correlation between said first chosen response and said second chosen response. The prompt could be a question or a content. The plurality of responses could be a list of answers to said question, a rating, or a ranking. The system may also display an option to remove said prompt and said plurality of responses to a user.

In another embodiment, the system could additionally display said content and a content response to said first user and receive a first user selection of said content response, wherein said displaying said content to said second user is also partially based on said first user selection of said content response. The system could then receive a second user selection of said content response and display an updated content to said second user partially based on said second user selection of said content response.

In an eleventh embodiment, the system displays a prompt and a plurality of responses to a first user, displays an option to remove said prompt to a first user, receives a first user selection either of a chosen response selected from said plurality of responses or of said option to remove from said first user, and after receiving a chosen response, generates a content to said first user partially based on said first user selection from said plurality of responses.

The system could additionally display a prompt and a plurality of responses to a second user, and display an option to remove said prompt to a second user. After receiving a chosen response, the system can generate a content to said second user partially based on said first user selection from said plurality of responses. The system can also display an updated prompt and an updated plurality of responses to a user after receiving a user selection of said option to remove. The system can also display a sub-prompt and a sub-response to said user after receiving said selection. The content can be generated according to a prior user's association of a response and a correlated content.

In a twelfth embodiment, the system can display a prompt to a first user, receive a first selection of a response to said prompt from said first user, receive a first user rating of a content, display said prompt to a second user, receive a second selection of a response to said prompt from said second user, and display said content to said second user partially based on correlation between said first response and said second response.

In any of the embodiments, the content could be one of movies, music, concerts, television shows, books, games, toys, electronics, restaurants, vehicles, travel, real estate, schools, products, services, service providers, stores, advertisements, dates, and/or other users. The content can also be displayed according to a priority.

DETAILED DESCRIPTION OF THE INVENTION

The present invention discussed below includes systems, methods and articles of manufacture which segment information, created either by questions answered within divisive topics, issues and other subject matter, or pre-generated compounded topics including the same. The present invention may be implemented by a combination of hardware, software, and/or firmware, in various applications or may include a computer. The computer may be configured by a computer readable medium or program code to provide functionality. The program instructions may be those designed for the purposes of the present invention.

FIG. 1 of the accompanying drawings illustrates a general overview of an information retrieval client-server network 2 in which the invention may be implemented, including a variety of components that communicate over a public network 6, preferably the Internet. The information retrieval client-server network 2 includes a client system 4 and a search system 8. The client system 4, using Uniform Resource Locators (URL), accesses web servers through, in one embodiment, over a local area network (LAN), wireless area network (WAN), or an internet service provider (ISP). The client system 4 in one embodiment may include a desktop computer, a personal digital assistant or cell phone, or generally, any device that includes a graphical user interface (GUI) and/or a voice response unit (VRU) and can access a network. The client system 4 typically includes one or more processors, memories and input/output devices.

The search system 8 includes one or more search engines 10, a computer 10a, including a processing system, one or more content servers 12 and one or more profile servers 14. Generally, servers may include a central processing unit (CPU), a main memory, a read-only memory (ROM), a storage device and a communication interface all coupled together via a bus. The search engine 10, including a program, processes a search query entered by a user, and communicates with the content server 12 or the profile server 14, to retrieve content. The content server 12 stores content associated with the system 8, and the profile servers 14 store profiles generated by users, both acting as information providers for the client-server network 2, accessed by the computer 10a, when the user submits a query into the search engine 10.

Servers include databases, which may be implemented in a single storage device or in a plurality of storage devices located in a single location or distributed across multiple locations. The databases are accessible to the servers and clients, within the client-server network 2. The information stored in the databases may be stored in one or more formats that are applicable to one or more software applications that are used by the clients and servers.

Figure 2:
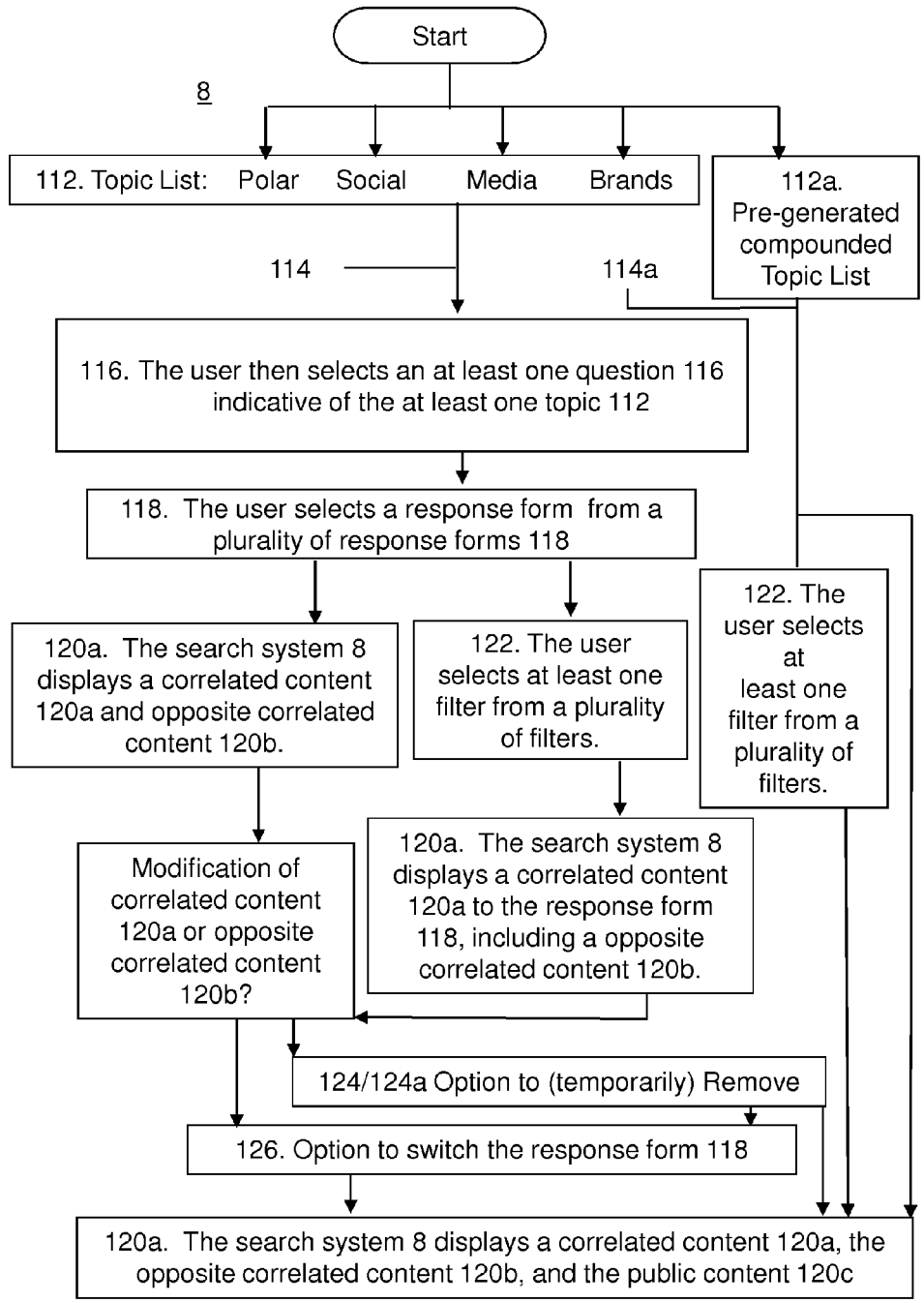
FIG. 2 is a flow chart, illustrating a method of segmenting information.

FIG. 2 illustrates a method for segmenting information. The search system 8 is responsible for processing submissions by the user of the client 4 and displaying content in correlation with the submission(s). An at least one topic list 112 is displayed on the graphical user interface of the client system 4. The at least one topic list 112 is comprised of topics from current issues and other information. In one embodiment, the at least one topic list 112 is related to social and political opinions, favorite media and brands, sports, hobbies or other topics that are either contested, debated, popular or polarizing to a population of people.

The search system 8 provides the user a means for selecting an at least one topic 114, from the at least one topic list 112. Typically the client 4 includes a mouse, touch screen, keyboard, or other technological improvements therein, to effectuate the selection by the user. The user then selects an at least one question 116 indicative of the at least one topic 114. The at least one question 116, includes a plurality of response forms 118. In one embodiment, the plurality of response forms 118 may be a selection of "yes" or "no." In another embodiment, the plurality of response forms 118 may be a selection of brands, locations or other forms that are other than "yes" or "no." The user then selects a response form 118 and the search system 8 displays a correlated content 120a. In another embodiment, the search system 8 displays an opposite correlated content 120b. In another embodiment, the search system 8 displays a public content 120c, which may include content that is currently popular among the general public.

In one embodiment, the correlated content and opposite correlated content, 120a and 120b, may be based on data generated from a population who answered an initial series of questions, or an "initial poll." In another embodiment, the at least one topic list 112, the at least one topic 114, and the at least one question 116 may be generated by the initial poll of a population. The initial poll will generate topics and questions that are currently debated, contested, popular, or polarizing to a population of people, by subjecting the population to a primary set of questions. In another embodiment, the initial poll will also contain questions concerning media, brands, sports, hobbies, interests and other information, so the search system 8 may correlate data and generate content.

FIG. 2 illustrates another method of segmenting information, according to an embodiment of the invention. The search system 8 includes a method of segmenting information by displaying an at least one pre-generated compounded topic list 112a. The user uses similar means described above for selecting from the at least one topic list 112. The pre-generated compounded topic 114*a* is selected and the search system 8 displays the correlated content 120*a* associated with the selection of the pre-generated compounded topic 114*a*. The pre-generated compounded topic 114*a*, in one embodiment, may be a combination of the at least one topic 114.

In an embodiment, the search system 8 displays an opposite correlated content 120*b*. In another embodiment, the search system displays the public content 120*c*, which may include content that is currently popular among the general public. The correlated content and opposite correlated content, 120*a* and 120*b* respectively, may be generated in a similar fashion by the initial poll. The public content 120*c* provides the user an ability to view, rank/sort, and compare content devoid of correlated influences placed on content displayed in 120*a*/120*b*.

The pre-generated compounded topic list 112*a* includes current issues or other information. In another embodiment, the subject matter is related to social and political opinions, favorite media and brands, sports, hobbies or other topics that are either contested, debated, popular or polarizing to a population of people.

The search system 8 includes an option to select an at least one filter of a plurality of filters 122, modifying the displayed correlated content 120*a*. In one embodiment, the filter 122 may be a range such as age, price, location, and/or time. The search system 8 then displays the opposite content 120*b* and the correlated content 120*a*, allowing the user the ability to visualize the content directed to those users who selected the opposite, or different, response form 118.

The search system 8 includes an option to remove 124, or temporarily remove 124*a*, the at least one question 116 and an option to switch 126 the response form 118. The options provide the user the ability to view distinctions, by a single movement or click, in the displayed content without having to start over by re-entering questions into the search system 8. In one embodiment, the search system 8 includes displaying the correlated content 120*a*, the opposite content 120*b*, to the response form 118 according to a priority. The priority may be by popularity, but may also include such factors as alphabet, release date, and/or price. The user is then able to customize how the content is displayed.

FIG. 3*a* includes a tracking overlay 32. The tracking overlay 32 is comprised of a rating panel 34, including a plurality of rating factors 34*a*, and a selecting panel 36, including a plurality of commands 36*a*. The tracking overlay 32 functions to sort and rate the displayed correlated content 120*a*, the opposite correlated content 120*b*, and the public content 120*c*, using the selecting panel 36 and the rating panel 34, respectively.

Figure 3C:
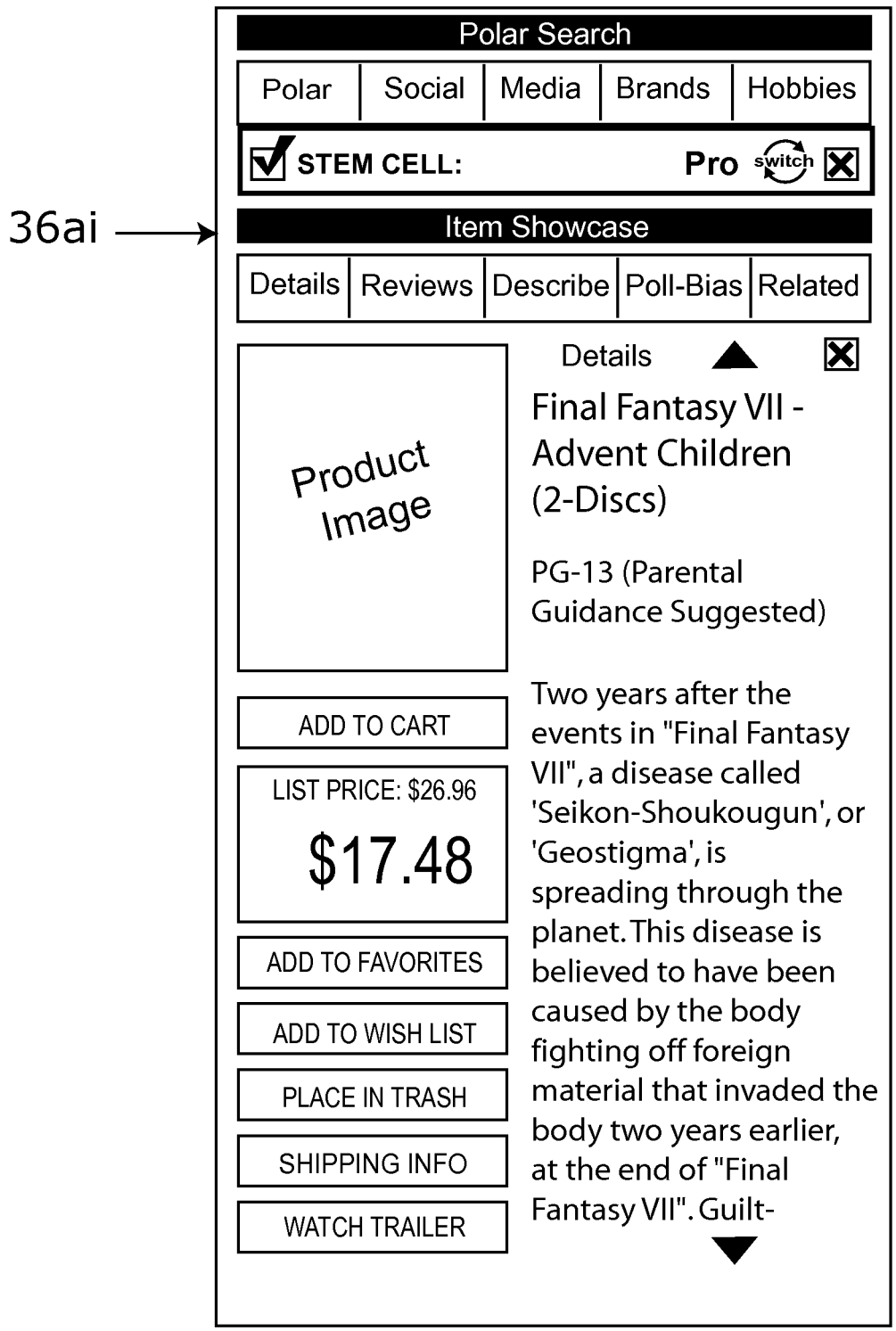
FIG. 3c illustrates a result of selecting a detail feature as a command.

FIG. 3*b* illustrates the tracking overlay 32 and the selecting panel 36, including an undo feature as a command 36*a*, aiding the user in instances where a mistake in sorting occurs. FIG. 3*c* illustrates a detail feature as a command 36*a*, including, an at least one detail element 36*ai*. The at least one detail element 36*ai*, in one embodiment, allows the user to retrieve details about the correlated content, opposite correlated content, public content, 120*a*, 120*b* and 120*c* respectively and view current popular reviews and/or other user reviews, including those users with "like-minded" or "opposite-minded" views.

Figure 4A:
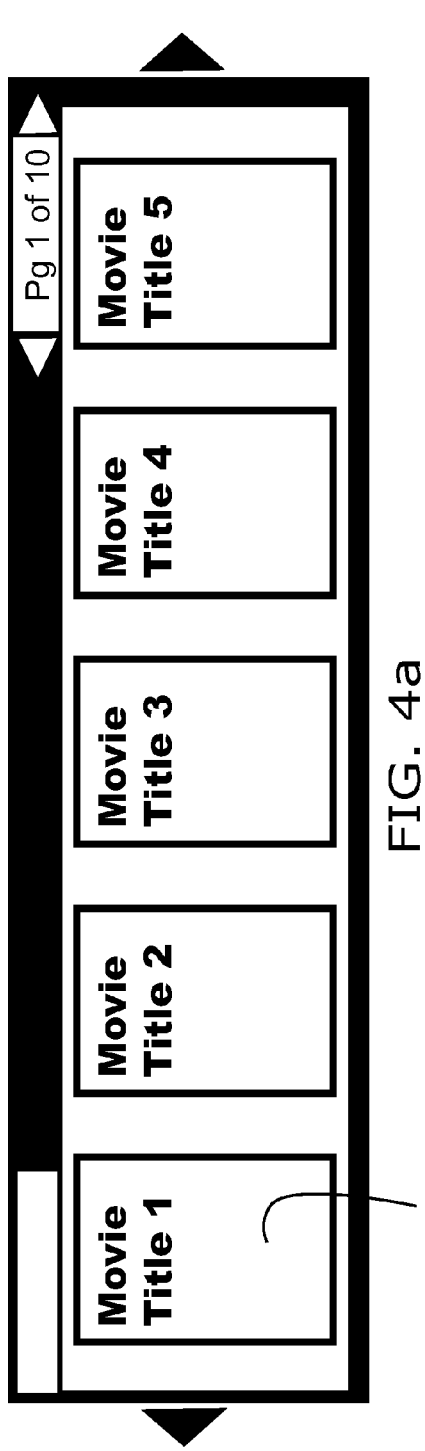
FIG. 4a illustrates a web screen of a displayed correlated content.
Figure 4B:
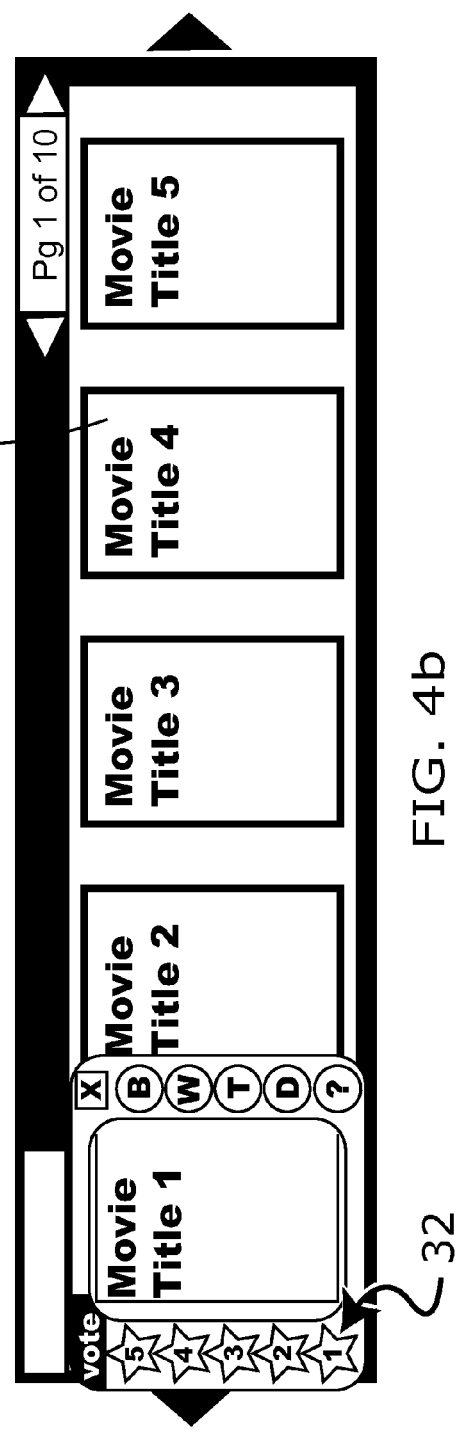
FIG. 4b illustrates a web screen of the tracking overlay, including the displayed correlated content.

FIG. 4*a* illustrates the displayed correlated content 120*a*, the opposite correlated content 120*b*, or the public content 120*c*. In one embodiment, the displayed correlated content, opposite correlated content and public content, 120*a*, 120*b* and 120*c*, respectively, are displayed simultaneously. FIG. 4*b* illustrates the use of the tracking overlay 32. The user places the tracking overlay 32 over the correlated content, the opposite correlated content, or the public content, 120*a*, 120*b*, 120*c*, respectively and as describe above, provides the user options to sort, using the selecting panel 36, and rank, using the rating panel 34, the displayed content.

The user, upon using a mouse or tracking device, to which the tracking overlay 32 is guided, selects the correlated content, the opposite correlated content, and/or the public content, 120*a*, 120*b* and 120*c*, respectively, and in one embodiment, the plurality of commands 36*a* may serve to add content to associated bins, which may include a favorites bin for movies already seen and rated, a shopping cart bin for movies the user would like to buy, rent, or download, a wish list bin for movies that the user would like to see, but is not ready to buy, rent, or download yet, a trash bin for movies the user saw and did not like or does not care to see in any of the displayed content again, or the detail feature, which includes content details.

The user, upon selecting the correlated content, opposite correlated content, and/or the public content 120*a*, 120*b*, and 120*c*, respectively, in one embodiment, serves to generate a correlated content in the database of the servers, and also to increase a value of the selected content within the search system 8.

In one embodiment, the sorting of the correlated content 120*a*, optionally, disposes the correlated content 120*a*, including the opposite content 120*b* and public content 120*c*, allowing the user to prevent the correlated content 120*a*, 120*b*, 120*c* from being displayed in 120*a*/120*b*/120*c*. The search system 8 functions to slide the correlated content 120*a*, the opposite correlated content 120*b*, and the public content 120*c*, laterally into the tracking overlay 32, providing the user minimal motion to sort. The search system 8 allows the tracking overlay to sort through thousands of content by the click of a mouse, a keyboard or functional equivalent and store that content in different unique locations, without having to drag and drop separately. The search system 8 provides the user with varied profiles, allowing the means to manage the at least one user profile 38, in cases where the user may be interested in information for others.

The system can track all currently selected questions of the at least one question 116 and the plurality of response forms 118 along with the content or item being sorted and/or ranked by the tracking overlay 32. Depending on the strength of the data known about the user, the response form data further builds the correlations with content in the database. For example, if the user is known to be relatively new to the website/application and/or uses the system anonymously, the correlation may be none or relatively low. As the user uses the system over time and creates more definitive data and/or creates profiles, the correlation to the response form data and the user's content sorting and/or rating for use by other users increases.

Figure 5:
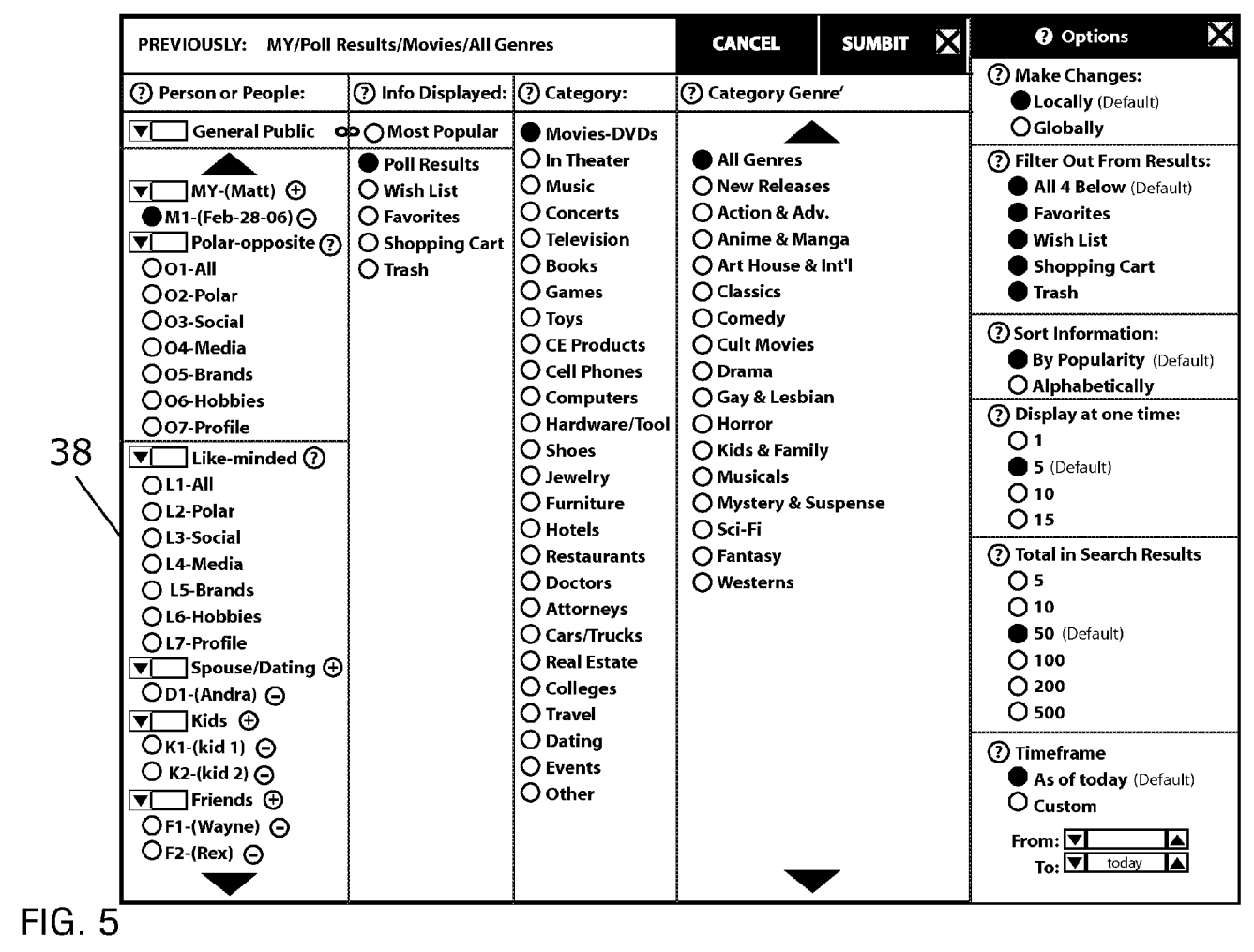

FIG. 5 illustrates a means for managing an at least one user profile 38. The user profile is generated from sorting the correlated content, the opposite correlated content, and/or the public content, 120*a*, 120*b* and 120*c*, respectively, in one embodiment, using the tracking overlay 32. The user may manage various profiles created for family, friends, groups or any other association for which the user may search for information. In another embodiment, the search system 8 includes the ability to compare the at least one profile 38 to other profiles within the search system 8.

In one embodiment, the user may compare generated profiles, other user profiles, including those profiles opposite or similar in thinking, and subsets of profiles, including the at least one topic 114, the at least one question 116, and the associated bins; favorites, shopping cart, wish list and trash. For example, the user may restrict the search to a specific topic such as polar, social, media, brands, and/or hobbies, or a specific question(s) within those topics, presenting the user with associated content. The user may also compare associated bins with another user or users.

In one embodiment, generated profiles may be assigned a coding scheme associated with the at least one topic 114 and/or the at least one question 116. The coding scheme in one embodiment may represent a color channel of a spectrum, or a plurality of color channels of the spectrum, wherein the user's color code may be values, or intensities, within the channel(s). The color may represent a category of associated topics and/or questions. For example, politics may be a blue channel of the spectrum, and questions within the topic may determine whether the user is liberal, moderate, or conservative based on how the user answers. If other questions are answered that fall into other topics with other color channels, the user may be assigned a value, or intensity, within those colors and the total applicable colors may be combined, while individual values based on the combination are still retained, creating a unique identifier. The coding scheme allows for the classification of users by retrieving and analyzing the plurality of response forms 118, which identifies and distinguishes users, segmenting them into groups in which there are members. The information will be stored in a manner that associates the user with the selected group.

Management of the at least one profile 38 also allows the user to compare generated profiles, other user profiles, and subsets of profiles by cost and/or time functions. For example, the user may compare costs associated with profiles generated for different family vacations. The user may also compare profiles according to a time schedule, which may highlight changes between compared generated profiles, another user's profile and/or subsets of profiles, from month to month, year to year, or other time frame. In one embodiment, the user may compare the use of the tracking overlay 32 on different websites with content generated within the system.

In one embodiment, a plurality of collaborative components may be included. The plurality of collaborative components may include a blog application, discussion forum, persistent chat application, shared voice application, shared calendar, shared media library/inventory, shared shopping history, and a shared document library. The collaborative components provide the user a way to publicize data, share information, such as the initial series of questions, or initial poll, and participate in debates. In another embodiment, the discussion forum may allow the user to filter out responses from selected users, and also allowing collaboration with those who are "like" or "opposite" minded.

Figure 6:
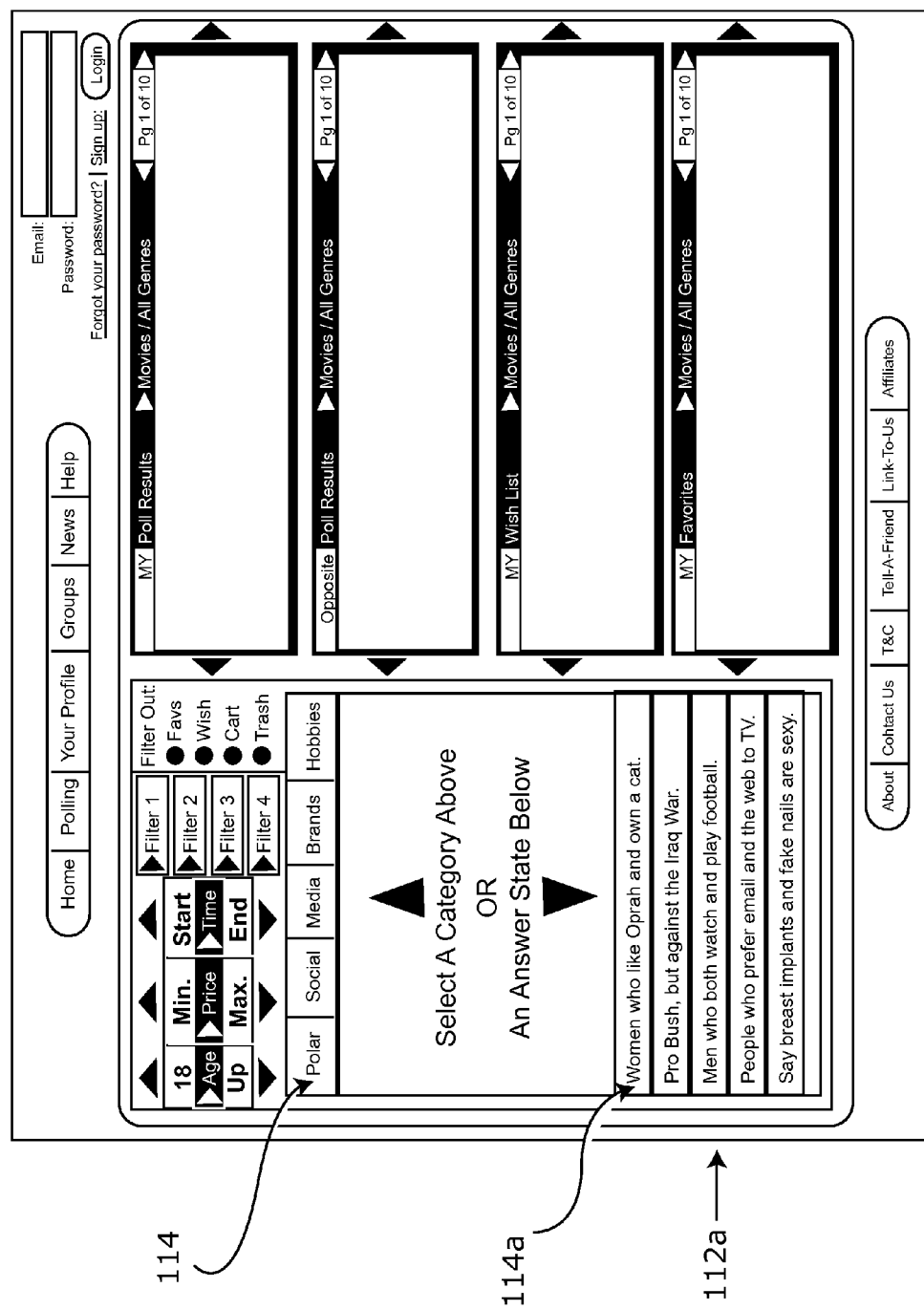
FIG. 6 illustrates a web screen of an at least one topic list and an at least one pre-generated compound topic list.

In use, the user accesses the client 4 graphical user interface, configured to access the search system 8, through the public network 6. FIG. 6 illustrates a web screen according to an embodiment of the invention. The user is presented with the at least one topic list 112 on the graphical user interface of the client system 4, including a pre-generated compound topic list 112a. The user selects the at least one topic 114 or the least one pre-generated compounded topic 114a. In one embodiment, the pre-generated compounded topic 114a is selected and the search system 8 displays content.

Figure 7:
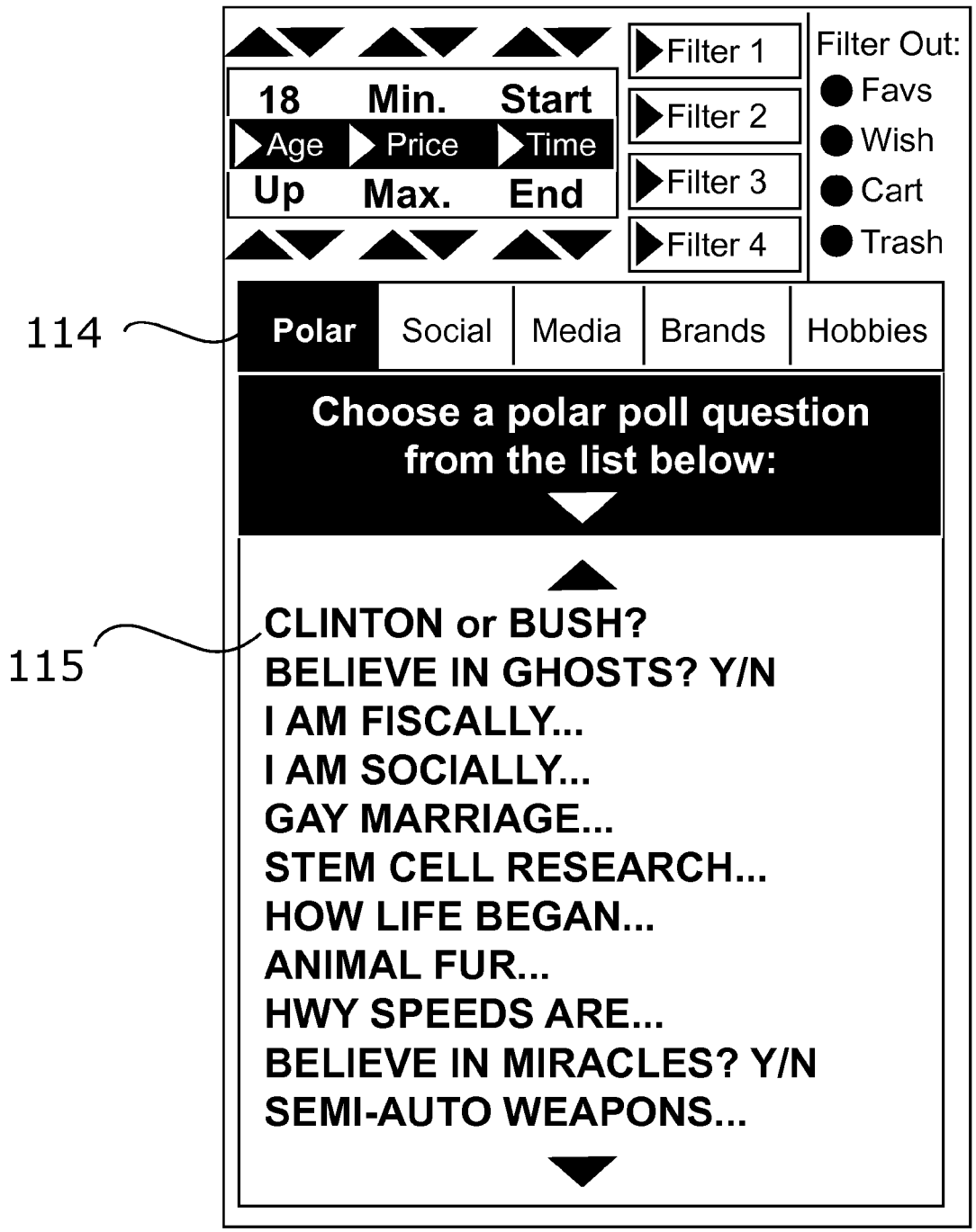
FIG. 7 illustrates a web screen of the at least one topic, including an at least one question, including a plurality of response forms.

FIG. 7 of the accompanying drawings illustrates a web screen of the at least one topic 114. The at least one topic 114 may include a condensed statement 115. In another embodiment the at least one topic 114, may include a plurality of at least one question 116. The condensed statement 115 may be a short version of the at least one question 116, and in some examples may generate the at least one question 116 when chosen, as seen in FIG. 8.

Figures 8, 9:
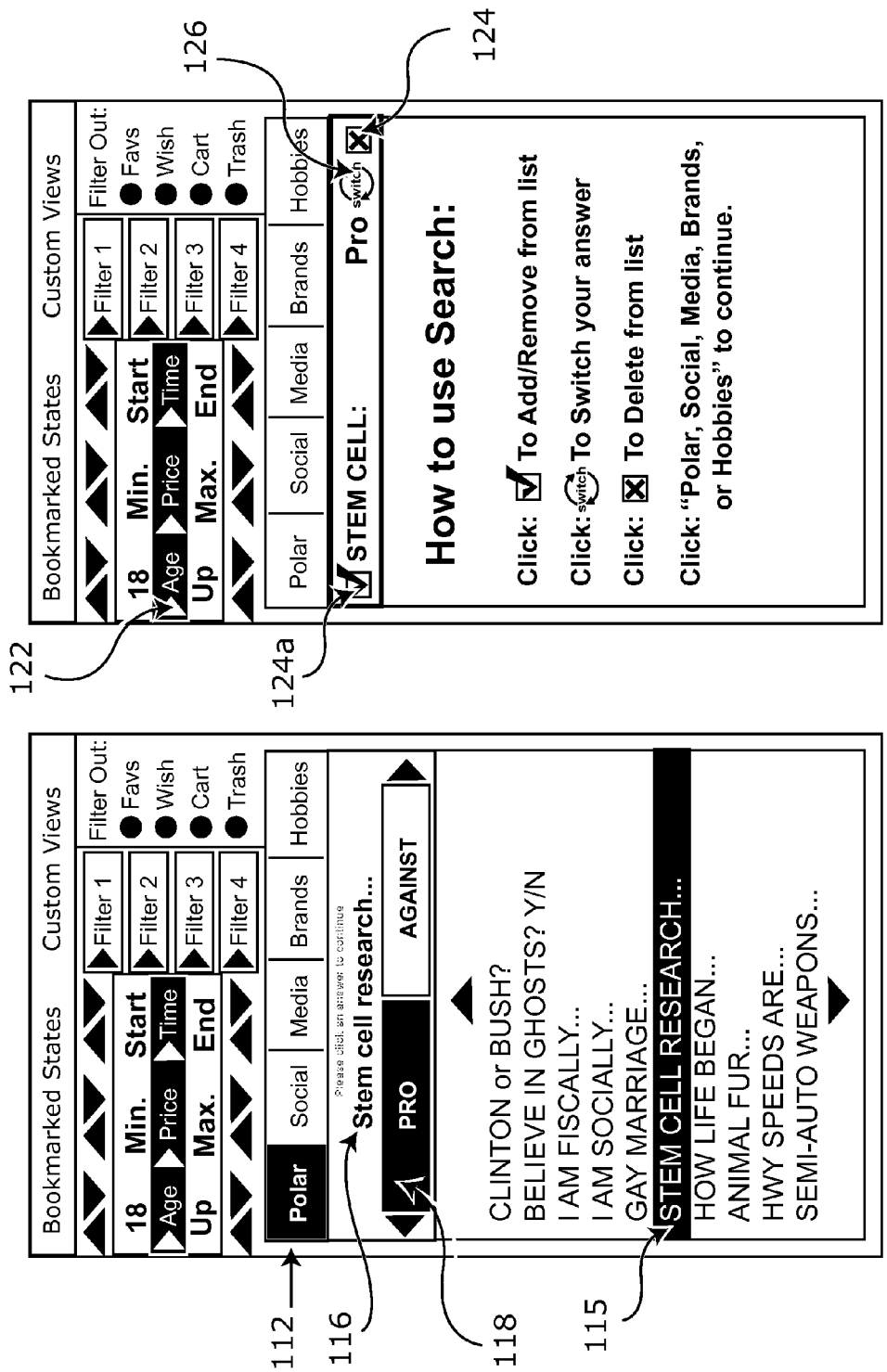
FIG. 8 illustrates a web screen of the at least one question, including a plurality of response forms, including a selection of an answer form.
FIG. 9 illustrates a web screen of a plurality of filters, including an option to switch and an option to delete, the answer form and the question, respectively.

FIG. 8 illustrates a web screen of the user selecting the response form 118. For example, the user selected "stem cell research" as the condensed statement 115 under the at least one topic 114, "Polar," and is presented with a "pro" or "against" response form 118. In this example, the user selected "pro." FIG. 9 illustrates a web screen that occurs after the response form 118 is selected. The search system 8 includes an option to select the at least one filter of a plurality of filters 122. The filter 122 may include a range such as age, price, location, and/or time. The filter may also include religion, ethnicity, age, occupation, gender, and/or income. The search system 8 also includes the option to remove 124, or temporarily remove 124a, the at least one question 116 and an option to switch 126 the response form 118, modifying content, allowing the user to visualize the distinctions in each displayed content without having to start over by re-entering questions into the search system 8.

In one embodiment the option to switch includes the correlated content. For example, the response form 118 may contain responses corresponding to brands, manufacturers, or other information that does not require a "yes" or "no" answer. When the user elects to switch the response form 118, the option to switch will display the correlated content as to which brand, manufacturer, or other information that is most sought after within the system.

Figure 10:
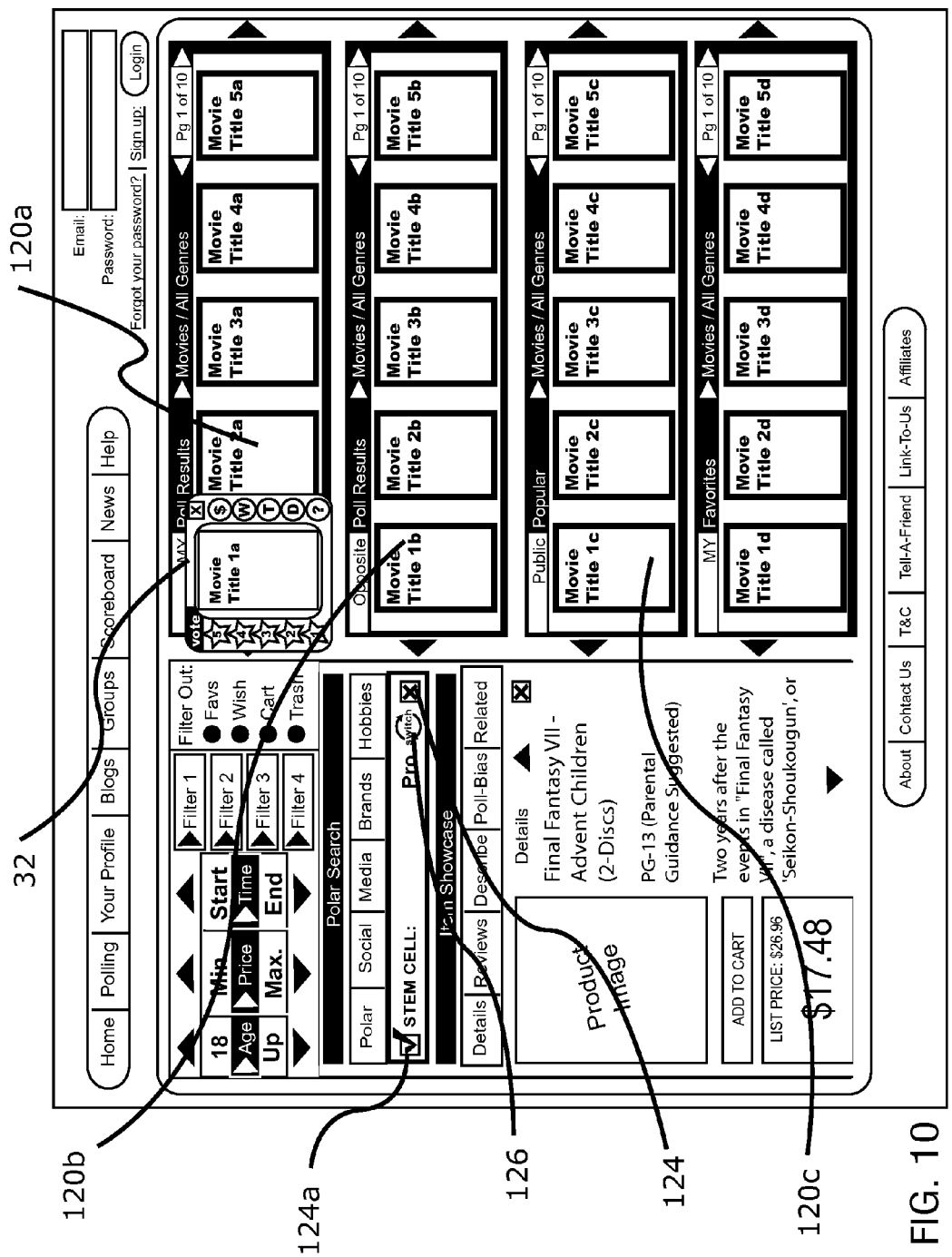
FIG. 10 illustrates a web screen of a correlated content generated, including the tracking overlay.

FIG. 10 illustrates the search system 8 displaying the correlated content 120a, including the opposite correlated content 120b and the tracking overlay 32. In one embodiment, the correlated content 120a is displayed in the priority. In one embodiment, the user may customize the display, either by alphabet, popularity, release date, or price. The opposite content 120b is displayed, so the user is able to visualize the content directed from those users who selected a different response form 118.

The correlated content, opposite correlated content, and public content, 120a, 120b, and 120c, respectively, in one embodiment may encompass books, movies, and other media. In another embodiment, the content may correspond to hotel locations or be websites corresponding to hotel location, or generally be any type of product, service, item, place, person, website, or information that users may search for. In another embodiment, where the user selects brands or response forms other than "yes" or "no," the opposite content 120b may include content associated with a remainder, i.e. products, services, items, places, persons, advertisements, video clips, audio clips, websites, or other information correlated to the brands not chosen by the user. For example, the user may be presented with a selection of names of four automobile manufacturers and asked for a favorite. After selection, the user may then be presented with content associated with those who also selected the same manufacturer in the displayed correlated content 120a, and the remainder of the manufacturers may be presented in the displayed opposite correlated content 120b.

In one embodiment, the user may be presented with a list of hobbies and asked for a favorite. After selection, the user may then be presented with the displayed content 120a to those who also selected the same hobby as one of their favorites, and the remainder of the collected user opinions from all other hobbies may be prioritized and presented in the opposite correlated content 120b.

The system allows the user to place the tracking overlay 32 over the correlated content, either 120a, 120b, and/or

120c to sort and/or rate data by use of the rating panel 34 and selecting panel 36, respectively. In one embodiment, the search system 8 functions to slide the correlated content 120a and opposite correlated content 120b towards the tracking overlay 32.

In an embodiment, the tracking overlay 32 includes an undo feature as a command 36a, aiding the user in instances where a mistake in sorting occurs. In another embodiment, the mentioned associated bins, or subsets, may be associated with the management of at least one profile 38. The bins may be compared over time and against generated profiles and/or other user's profiles and associated bins.

In an embodiment, the tracking overlay 32 may be used separately, on at least one website, operating independently from any concurrently active program, appearing concurrently within a user interface, allowing the user to work with the concurrently active program. The tracking overlay 32 captures a plurality of identifying markers of the data from the at least one website and stores the identifying markers with the profile server 14.

Generally, search sites offer a select group of products (e.g. cars), people (e.g. dating), or items (e.g. travel). These sites become bookmarks when users find themselves in the market. An advantage of the invention is that the system functions as a central repository for a user's entire history, including views on products of interest, media tastes, shopping desires, product purchases, places, people, advertisements, video clips, audio clips, websites, along with the user's detailed personal profile, including such things as gender, age, occupation, income, health, appearance, political views, legal views, hobbies, brand preferences, sports tastes and interests, travel history and interest, views on animals, family structure, sex, religious beliefs, and environmental views. It follows that suggestions included in the invention become more tailored, and thus more efficient because the user has invested in this central repository.

Another advantage of the invention includes the ability to shop and search for products and interests of segmented people, allowing the user to discover and converse with like-minded people or venture into neighboring groups of "near" "like-minded" people. These segmented profiles not only provide comradeship, but they can be tremendous sources of expertise. The invention also provides the ability to discover and communicate to "opposite-minded" people, to learn from or confront them via social search, blog pages, chat sessions, or forums.

One advantage the invention offers is the ability to search items using segmented personality traits, views, or opinions without typecasting oneself. For example, a user may search for items based on "conservatives that support stem cell research," when the user is actually a liberal, not a conservative. This may be for entertainment purposes or to shop for a friend that meets that profile without disrupting the user's own profile.

When traditional shopping sites inform the user that "people who bought that book," the user is about to buy, "also bought these books" the site is creating and using correlation tables. These features are useful to users, but there are flaws and limitations. For one, the system does not allow for creating separate individual profiles for individual moods/personas. Each of us has several completely different profiles, e.g. one for our sports interests, one for our occupation, and another for our travel desires.

Furthermore, the suggestions that are made from existing art come from a very limited amount of knowledge about the shopper or searcher. If a website can attract shoppers by making a suggested purchase off of a single previous book purchase, it follows that a suggestion would become better if the website knew far more purchases that the shopper already made. However, few shoppers/people want to take the time to rate/rank that much content, especially if it means that they would have to first find it and/or type the name of each title in one-by-one. Thus, another advantage of the invention is that the user is able to share or store prior interests or purchases relatively quickly. For one, the invention's tracking overlay 32 tool easily allows people to quickly build a list of items to place in one's favorites, wish lists, shopping cart, and/or trash.

Another advantage of the invention is how search results are displayed and consumed by the user. With existing art, interpreting a user's search result can be a time-consuming process of reading reams of text or a nonsensical colleague of images. The invention provides for a highly organized layout with items prioritized from left to right in several rows. Row one or a top bin is typically the response to the user's answered questions with correlated content 10a, such media or items, like movies, music, or games, but it may also be such things as travel locations, college courses, or suggested doctors.

The user can simply place the tracking overlay 32 over the first item within the search results 120a/120b and then click the appropriate rating factor 34a on the tracking overlay 32 that represents his/her feelings towards this item, e.g. "5 stars" for "love it" to "1 star" for "not so good", and/or command 36a, including "w" for "wish list" to "$" for "add to shopping cart".

Another advantage of the invention is that when the tracking overlay 32 is used, the invention functions to conveniently slide the next item of interest under this powerful tool for the user in a fraction of a second. This in turn allows this user to continually critique the prearranged/sorted content without having to move the mouse outside the tracking overlay 32 itself and/or around the web/app page. The content that moves under the tracking overlay 32 that has been prearranged according to the user's currently selected priority settings (e.g. popularity) and the user's answers given to a single, or list of, questions does not end at the five items displayed in the correlated content 120a and opposite correlated content 120b.

For example, if the content is movies, typically the default view for any given row of content in 120a/120b/120c is five images at a time, but the user can change this value to show more or less images at a time and more or less text information/details. By default the user only sees unadulterated box cover art, allowing them to determine what the movie is immediately and the ability sort at a high speed. Furthermore, the list of prioritized content continues off the page and as the content slides into view, each can be sorted/ranked according to the user's views until the content in the entire database has been exhausted. Meaning that if the user asked the system to show him the movies that ranked the highest among "males" verses "females", then that list may be for thousands of movies.

Even though the user would only see the first five movies at a time, this list may continue to as many movies that have ever been previously sorted/ranked by males in the system. So a user may use the tracking overlay 32 and never leave the relatively small screen real estate that makes up the tracking overlay 32 and within a matter of minutes, sort/rank hundreds if not thousands of movies or as fast as the user can select an appropriate symbol and click the mouse. Sort means to place in a bin associated with a subject, e.g. Favorites, Wish List, Shopping Cart, or Trash. Rate or rank means to provide a score to the content or item, such as "5" for "the best", down to "1" for "not that good".

The benefit to sorting/ranking so many movies is that now a suggestion can be made on hundreds of movies in the user's profile and from other's profiles. Furthermore, the database not only stores other movies or media items to suggest, but also the individual's opinions, views, and interests based on other profiles in the database. The user can use these tools and remain anonymous, protecting privacy. The better the suggestions, the more likely the user is to continue to increase his/her usage. Even if the user remains anonymous, his/her usage will build better correlation tables for content suggestions to future users.

If the user made a mistake, changes his or her mind, or later wish to re-categorize a sorted/ranked/tagged item, there are several methods available. Tagged/tagging means to assign comments or views to an item or content, e.g. "saw this movie with my wife and she liked it, but I didn't." A user can use the undo feature as a command 36*a* on the tracking overlay 32 that allows the user to undo any rating or bin/sort assignment. In one embodiment for example, the user clicks the "W" symbol on the overlay tracking 32 to place the selected item from content in either 120*a*/120*b*/120*c* into the user's "wish list". While remaining in displayed content 120*a*/120*b*/120*c*, the "W" symbol on the tracking overlay 32 remains a "W" to allow the user to place the next prioritized item that appears into the user's "wish list". When the user moves the overlay tracking 32 to a particular bin, in this example the "wish list", the "W" symbol changes to a "U" symbol for the "undo" feature. The user can then click "U" to remove the applied ranking or sorting and the item reverts back to its appropriate position in content 120*a*/120*b*/120*c*.

If the user's opinion changes on a movie or an item the user can remove it or reassign it from an assigned bin, e.g. favorites, wish list, shopping cart or the trash. If the user discovers it in someone else's profile, e.g. someone else's favorites/wish list/shopping-cart/or trash and the user decides that he or she has yet to include this movie or item into a designated bin, then that user can sort/rank/tag and move this selected item into a bin without affecting the other user's bin(s) or assigned classifications/rankings.

The system also records how and when an item was removed from a bin, e.g. the trash. For example, was the item removed right away and likely placed there by mistake, or was it removed when the user was comparing data with another friend's Favorites, and thus likely that the user was influenced by this other user's taste.

The advantage to the collection of the data on when and where items move from one bin to another (e.g. like-minded polls/opposite-minded polls; my: favs/wish/trash/cart; and others: favs/wish/trash/cart) is that the data may show which item was most removed from the database's collective trash over the past month. If the data indicated that the number one item removed from the collective trash over the past month was a local restaurant that was recently remodeled, then that data may be shared and affect how other users view the restaurant in the future.

The system can also track who was the first user to make this sorting/ranking/tagging assignment change and thus credit this early influencer with points or provide some other beneficial means to credit the user. This also applies to users that are first to sort/rank/tag new items in the system or from the public content 120*c*, whereas these users may receive more points/credits than those users who end up sorting/ranking/tagging these same items much later in time or after a certain numeric threshold. Thus encouraging people to be the first to review/sort/rank/tag an item. An advantage to comparing a user's personal bin activity and changes made over time or against other users, creates useful discovery tools in trends.

Another aspect of this unique social search is that the results of answering a question from the list of questions, not only shows what "like-minded" people with the same beliefs to a particular issue or question have said, but also what the complete opposite had to say (referred here as to the "polar opposite"). For example, if a user was searching for a DVD movie suggestion based on political affiliation to either the Clintons or the Bushes, the search results 120*a*/120*b* might bring back something like this:

The most popular movies overall for those who prefer the Clintons 120*a*:
1-The Godfather, I®
2-Blade Runner®
3-Forrest Gump®
4-The Godfather, II®
5-The Matrix®
6-Fight Club®
7-The Shawshank Redemption®
8-2001: A Space Odyssey®
9-Apocalypse Now®
10-Citizen Kane®

The most popular movies overall for those who prefer the Bushes 120*b*:
1-Forrest Gump®
2-Star Wars®
3-Pride and Prejudice®
4-The Passion of the Christ®
5-The Matrix®
6-Austin Powers®
7-Guess Who's Coming to Dinner®
8-A River Runs Through It®
9-Lawrence of Arabia®
10-Cool Hand Luke®

This unique two-sided method has many benefits. For one, the user might find interest in some of the movie suggestions from the opposite correlated content, or "polar opposite" list 120*b*. This would benefit the user, in cases where the user prefers the Clintons and really liked the movie "Pride and Prejudice®" or had hoped to buy it, but the movie currently only appears under the Bushes in the opposite correlated content 120*b*. Also, in some cases this item may never have crossed the user's mind, had it not appeared in the "polar opposite" list. If the user assigns a movie to a bin, this in turn also moves that particular movie up the ranks among Clinton supporters.

The invention allows for adjusting more than single variables. The user can add in filters for gender or age to further find interests and views of like-minded people (the user's age) or where these people are likely to be congregating during the user's upcoming trip or for the user's weekends where he/she stays in town. Such detailed social search tools are not presently built into searches at Hotels.com or even Google®. Craigslist® has become a very geo-targeted search site, where people search local events of like-minded people in their local communities, but there is quite a bit of effort required. There is relatively little structure or tools available for even like-minded reviews or suggestions, let alone the complete "opposite" or a variety of segments.

When people create their own personalized web page and/or blogs with existing art, it is relatively difficult to normalize their opinions or systematically compare those opinions with others. The invention not only helps normalize media content, but most of the terms used for opinions, interests, hobbies, personal characteristics, and beliefs as well. So instead of someone simply classifying oneself as "left-wing", "a liberal", "a democrat", or similar, the system provides users with questions and concrete/normalized answers, such as: "Do you consider yourself socially conservative or liberal?" and "Do you consider yourself fiscally conservative or liberal?" Other more granular details are also available, such as one's views on stem cell research, gay marriage, abortion, gun-control, term-limits, government spending, and war (just to name a few) which can also help distinguish the differences among a group of so-called liberals or conservatives.

Another significant advantage of this invention over existing search and segmentation art is the ability for the user to quickly and effectively determine the relevance of individual elements of the user's information searches. When the user answers several individual questions and then stacks those answers, e.g. beliefs, brands preferences, and/or personality traits one on top of another, the system provides a collective result correlated content and opposite content 120a/120b to the combination of answers.

For example, if a user wanted to see the top movies for his answers of (1) "Pro" "Stem Cell Research", (2) favors the retailer "Target®" (over "Wal-Mart®"), and (3) "Had A Happy Childhood" (verses "Had An Unhappy Childhood") then the system would combine these three answers to create a list of correlated content 120a of the top movies among like-minded people who said that they too were "Pro" Stem Cell Research, preferred "Target®" and "Had A Happy Childhood" and another list of opposite content 120b of "opposite-minded" people who said that they instead were "Against" "Stem Cell Research", preferred "Wal-Mart®", and "Had An Unhappy Childhood".

With traditional search tools it can be very difficult and time consuming to determine exactly how each individual variable is affecting the collective results within a search parameter/query. With existing art it also can be frustrating when one tries to put together the right combination of terms, only to lose or forget what search terms one originally started with. However, within the current invention, the user can quickly make changes without the consequences of losing one's original search or search parameters.

The invention provides the user the ability to temporarily remove an answer/term/trait/hobby from a stack and see how it affects the results and/or switch answers all with a single click of the mouse. For temporarily removing an item, the user removes a check mark that can be toggled on/off and then immediately see the results. The invention is an advantage over existing art where a search result typically means a page full of text that is difficult for one to quickly digest and thoroughly compare to the previous search results without having to slowly read all the material on the page.

Figure 11:
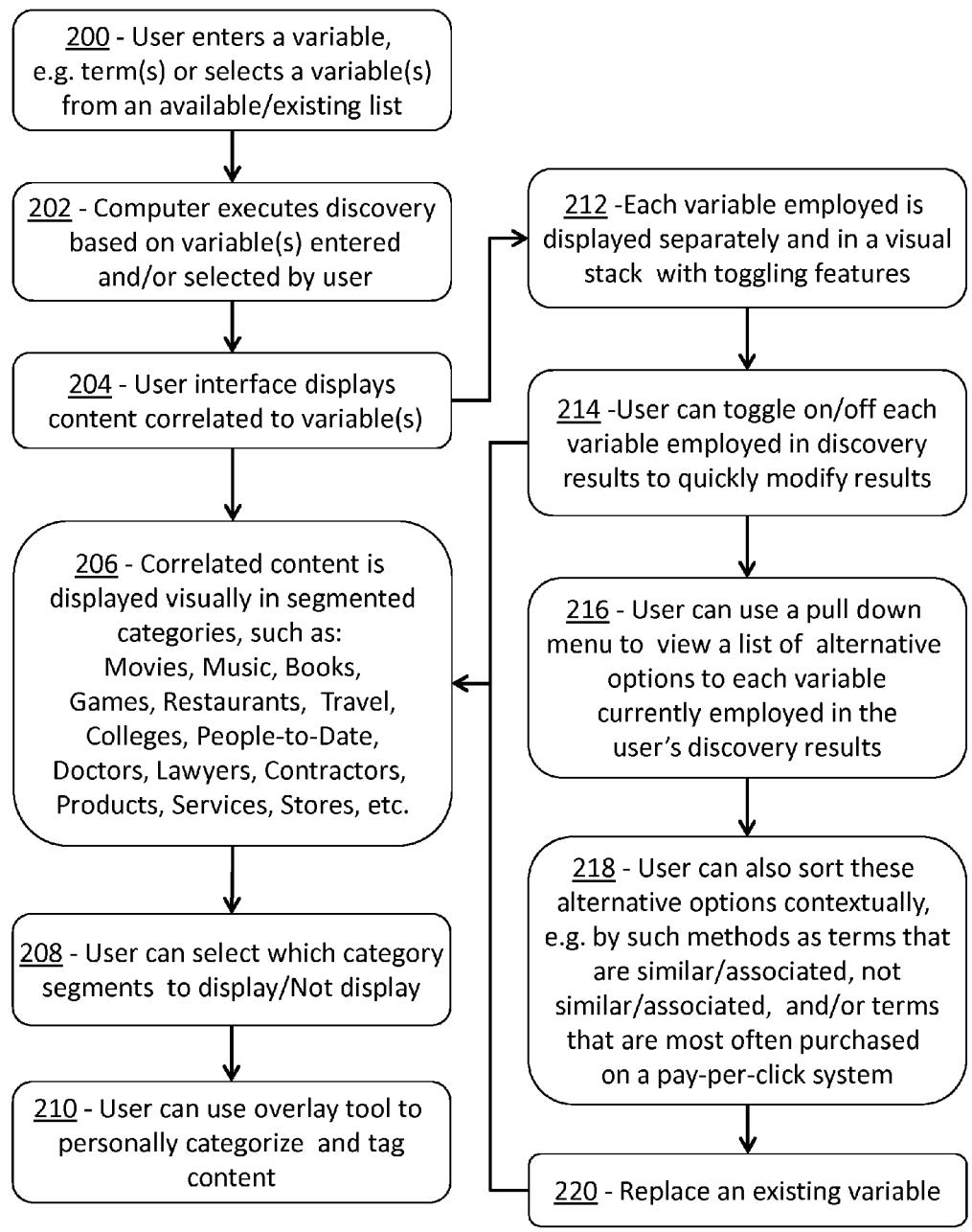
FIG. 11 is a flowchart that depicts an example embodiment of the process by which a user could use variables to search and/or discover new content.

The invention provides the user the ability toggle multiple variables on/off and/or "switch" variables, and quickly compare the results, not just of text, but of box cover art of movies or pictures of people or places that the user recognizes as they move up and down the user's search result rankings, or as items disappear from the user's search results all together with each of the user's mouse clicks or variable toggles (see an instance, depicted in FIG. 11).

From the example above, the user may switch his answer on "Target®" to "Wal-Mart®" and immediately see that the number one movie "Godfather®" in row correlated content 120a has moved down/right to position four and now the number one movie is instead "Forrest Gump®". He may then temporarily turn off his selected variable/view that he "Had A Happy Childhood" and see how that change affects his movie search results. This can create a very entertaining and useful experience, especially when the user is getting immediate feedback from his changes and he finds that he can create a large list of answers that he can fine-tune to find the right combination answers/traits for him to pull from that match his favorites/tastes or most desired media interests.

When the user is using the system for the first time, many of the movies or items may already be familiar to the user because the user has already viewed/consumed the movies or items. This also helps the user determine what stack of answers/variables creates the results that best represents the user's tastes. These search results or list of movie content 120a/120b can be used to pull movies that the user has already seen and add to his existing list of "favorites", put into his "wish list", "shopping cart" or "trash".

Most sites that request that people provide their favorite media items, typically request that they type up the list. This also creates problems with misspellings, or lack of normalized data, even with proper spellings. When people refer to the same movie slightly differently, e.g. Harry Potter 4®, the Goblet of Fire®, Harry Potter and the Goblet of Fire®, the fourth Harry Potter Movie®, etc., this creates problems when comparing data. An advantage of the invention lets users click on "pre-select/normalized" questions, answers, and box cover art. Consequently, the data is normalized from the start. Even if the user performed a text search, the data returns known normalized titles from the invention database.

FIG. 11 is a flowchart that depicts an example embodiment of the process by which a user could use variables to search and/or discover new content. Starting with a step 200 where a "User enters a variable, e.g. term(s) or selects a variable(s) from an available/existing list". In step 200, the user can enter a variable or variables as is used in typical search and/or select provided variables made available in a list. A variable represents one of several potential "variables" utilized in determining correlated content found in a search and/or discovery result.

In a next step 202, a "Computer executes discovery based on variable(s) entered and/or selected by user" and in a following step 204 is where the "User interface displays content correlated to variable(s)". In a step 206, is where the "Correlated content is displayed visually in segmented categories, such as: Movies, Music, Books, Games, Restaurants, Travel, Colleges, People-to-Date, Doctors, Lawyers, Contractors, Products, Services, Stores, etc." An example embodiment of this visual display of content is segmented categories is also depicted in FIG. 10 with part number 120a/120b/120c.

In addition to the segmented categories in the step 206, a step 212 has "Each variable employed is displayed separately and in a visual stack with toggling features". In a step 214, the "User can toggle on/off each variable employed in discovery results to quickly modify results". This toggle on/off feature per variable is also depicted as the part 124a in FIGS. 9 and 10.

In a step 216, the "User can use a pull down menu to view a list of alternative variables to each variable currently employed in the user's discovery results". A step 218 is where the "User can also sort potential variable replacements contextually, e.g. by such methods as terms that are similar or terms that are opposite to the existing variable employed". An example of "similar options" were cited earlier in specification where the user in one instance has selected "Verizon" and a list of "cell phone providers" could offer the user alternative variables/keywords such as (1) "Cingular", (2) "Sprint", (3) "T-mobile", or (4) "Other" and the like.

In a step 220 is where the user makes his/her selection to "Replace an existing variable". These user variable changes in turn are reflected in the step 206 where the correlated content is displayed visually in segmented categories. In a step 208 is where the "User can select which category Segments to display/Not display". These categories are also illustrated in FIG. 5, under the "Categories" column with the following examples depicted: (1) Movies—DVDs, (2) In-Theater, (3) Music, (4) Concerts, (5) Television, (6) Books, (7) Games, (8) Toys, (9) CE Products, (10) Cell Phones, (11) Computers, (12) Hardware/Tool, (13) Shoes, (14) Jewelry, (15) Furniture, (16) Hotels, (17) Restaurants, (18) Doctors, (19) Attorneys, (20) Cars/Trucks, (21) Real Estate, (22) Colleges, (23) Travel, (24) Dating, (25) Events, and (25) Other. These "Categories" also allows for "Category subcategories" shown as Genres for Movie-DVDs in the FIG. 5 example.

After the correlated content is displayed, in a step 210 is where the "User can use overlay tool to personally categorize and tag content". The overlay tool is also depicted in FIGS. 3a, 3b, and 4b, as part 32.

A benefit of the graphical interface of the invention, which is based primarily on images and visual tools, is that the human mind can recognize an image much quicker and easier than a large list of text. Using images allows content to be recognized by people of all ages and backgrounds, including those that are too young to read, those who do not speak English, and those who struggle reading fine text on computer monitors.

Besides the ability to easily store and categorize the user's media tastes, an advantage of the invention is it allows for a user to share opinions and media tastes with others. The invention provides users with values or color codes for individual profiles, collections of profiles, and/or an overall color/code. For centuries, humankind has tried to segment the general population for a variety of purposes. Today, large advertisers try to define their "core" audience well beyond traditional demographics. One of the earliest segmentation tools known is the zodiac symbols. These symbols are supposed to divide the entire world population into just 12 unique categories. To this day, people discuss the likelihood of a relationship's continued success based on the zodiac signs of each individual.

Filtering down the 6 billion people on the planet into 12 separate and distinctly different categories simply based on one's date of birth would seem rather difficult, if not impossible. People traditionally seek out like-minded individuals, but segmenting people for all circumstances can also be very difficult. Surely, one's search for like-minded people goes well beyond those that share one's zodiac sign. Consider a group of pro football fans who follow the same football team. These people share an intense interest during the events, but many may have very little else in common outside the events. This demonstrates the need for multiple profiles for each of us.

Today, companies such as eHarmony™ have created long surveys to try and segment their dating pool into single profiles. However, most of this data remains hidden from their paid customers and is certainly not made publicly available. Another advantage of the invention is that the system can turn the data outward without violating people's ability to remain anonymous, because for one, most of the data leads to very specific items, e.g. a DVD movie and not necessarily an individual's personal data, e.g. someone you are looking to date.

The user can keep all personal data private and can also remain anonymous. Should the user wish to share views to a limited number of fellow members/users on a limited number of subjects/items, the user can choose to. In addition, the user can participate in chats, forums, IMs (instant messaging), etc, as completely anonymous; as a specific profile; or as a collection of the user's profiles referred to here as the user's overall value.

This overall value is a combination of all of the user's opinions, purchases, decisions, and points/credits. By telling others a user's overall value, the user is revealing to others a short code for who the user is in regards to several issues. Just as a print shop manager describes a single color value in terms of four CMYK values, where C equals the amount of cyan ink to use, M the amount of magenta, Y the amount of yellow, and K the amount of black, the user's overall value says far more about the user then just a single simple color code value like "orange" might imply (an instance, depicted in FIG. 12 below).

Figure 12:
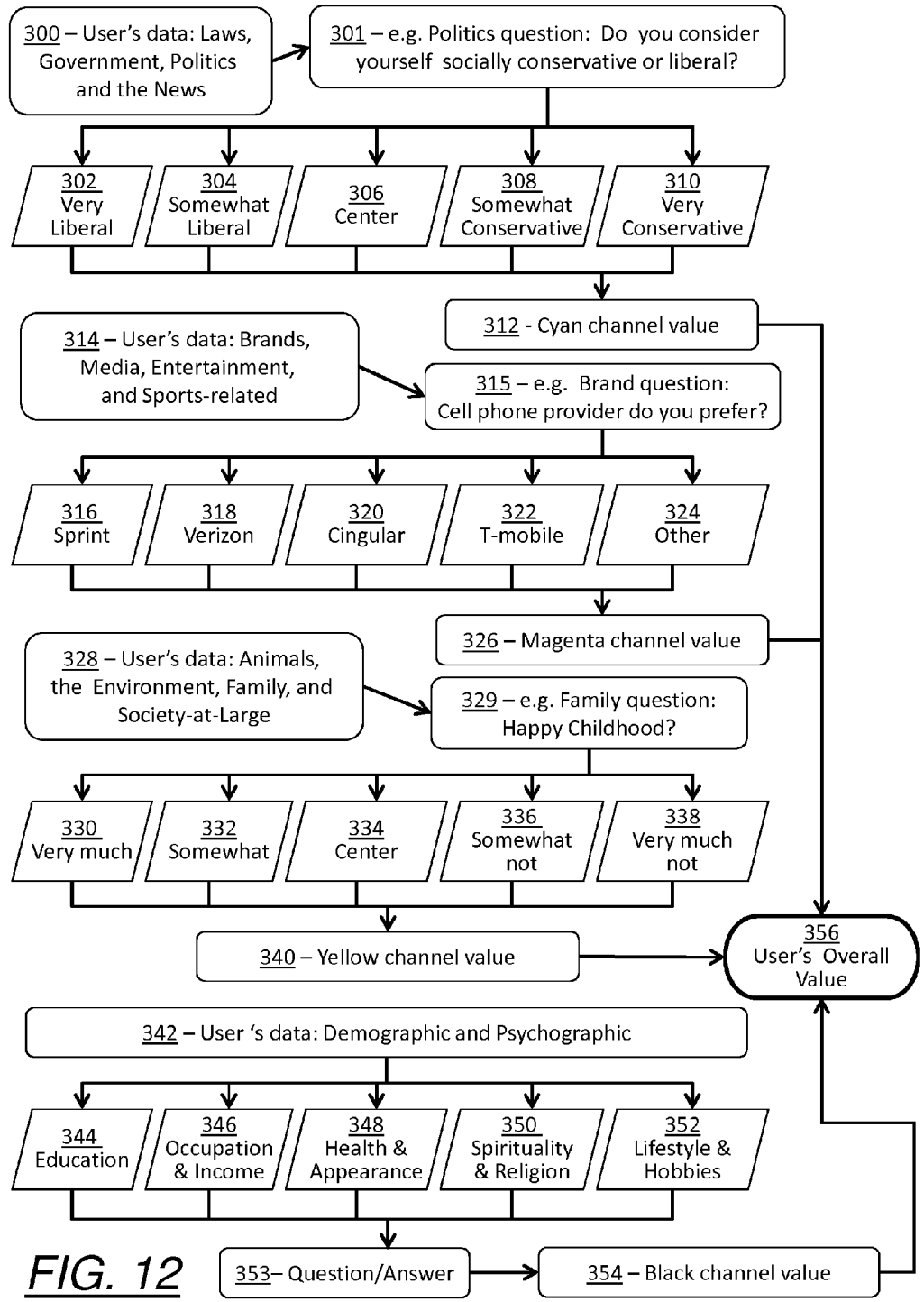
FIG. 12 is a flowchart that depicts an example embodiment of the process by which a user's overall value could be created utilizing the collective value of the CMYK channel values.

FIG. 12 is a flowchart that depicts an example embodiment of the process by which a user's overall value could be created utilizing the collective value of the CMYK channel values. Starting with a step 300, where the system collects a "User's data (regarding): Laws, Government, Politics, and the News" and collectively quantifies those values as being either a "Very Liberal" 302 value, a "Somewhat Liberal" 304 value, a "Center" 306 value, a "Somewhat Conservative" 308 value, or a "Very Conservative" 310 value. This is a simplified example and there could be a far more intermediate values dispersed along this continuum. The collective value generated creates a "Cyan channel value" in step 312 for this particular user.

Similarly to the above steps 300-312, in a step 314 is where the system collects a "User's data (regarding): Brands, Media, Entertainment, and Sports-related" and collectively quantifies those values as being either a "Very Liberal" 316 value, a "Somewhat Liberal" 318 value, a "Center" 320 value, a "Somewhat Conservative" 322 value, or a "Very Conservative" 324 value. This is a simplified example and there could be a far more intermediate values dispersed along this continuum. Quantifying the user's data as either liberal or conservative for a subject such as the entertainment and sports can be accomplished with data that reflect the user's views. For instances with entertainment, the user's views as to how much he/she likes the music of the Dixie Chicks®, Marilyn Mansion®, and Carrie Underwood®. For instances with sports, the user's views as to whether college athletes should be paid or not paid. The collective value generated creates a "Magenta channel value" in step 326 for this particular user.

Similarly to the above steps 314-326, in a step 328 is where the system collects a "User's data (regarding): Animals, the Environment, Family, and Society-at-Large" and collectively quantifies those values as being either a "Very Liberal" 330 value, a "Somewhat Liberal" 332 value, a "Center" 334 value, a "Somewhat Conservative" 336 value, or a "Very Conservative" 338 value. This is a simplified example and there could be a far more intermediate values dispersed along this continuum. Quantifying the user's data as either liberal or conservative for a subject such as the environment and family can be accomplished with data that reflect the user's views. For instances with the environment, his/her views as to whether the US should drill for oil offshore. For instances with the Family, his/her views as to whether a parent should or should not physically spank their child. The collective value generated creates a "Yellow channel value" in step 340 for this particular user.

In a step 342 is where the system collects a "User's data (regarding):Demographic and Psychographic" and collectively quantifies this value from a group of individual values including an "Education" 344 value, an "Occupation & Income" 346 value, a "Health & Appearance" 348 value, a "Spirituality & Religion" 350 value, and a "Lifestyle & Hobbies" 352 value. This is a simplified example and there could be a far more individual demographic and psychographic values. Quantifying the user's data for such subjects as education can be accomplished with scores that start with complete zero for birth and with values that increase with more education. The collective value generated creates a "Black channel value" in step 354 for this particular user.

The values in steps 312, 326, 342, and 354 are a passed along to a terminator 356 to collectively generate a "User's Overall (CMYK) Value". In another embodiment, each section above (312, 326, 342, and 354) could be separately distinguished to each generate a "User's Value" for that particular section.

For example, the steps 342 through 354 for the "User's data (regarding): Demographics and Psychographics" could instead be separated out where, for instances, the Cyan Channel Value is instead made up the user's "Education, Occupation, & Income"; the Magenta Channel Value is instead made up the user's "Health & Appearance"; the Yellow Channel Value is instead made up the user's "Spirituality & Religion"; and the Black Channel Value is instead made up the user's "Lifestyle & Hobbies". This collection would create a CMYK value just for these subjects, or in this instance, subjects within the user's Demographics and Psychographics.

In addition and in another embodiment, each of the individual elements, such as the user's "Education, Occupation, & Income", "Health & Appearance", "Spirituality & Religion", and "Lifestyle & Hobbies" could also be separated out to distinguish and create a CMYK value just for the user's "Education", and the like.

An advantage of the invention is the coding of a user's complete personality, interests and purchase history into a universal system that allows one to then extrapolate the user's individual traits. For example, the user's cyan channel may be made up of the user's views on such things as "Laws, Government, Politics, and the News", the user's magenta channel may be made up of the user's tastes and views on "Brands, Media, Entertainment, and Sport-related subjects", the user's yellow channel may be made up of the user's views on "Animals, the Environment, Family, and Society-at-large" and the user's black channel may be made up of the user's current demographic and psychographic profile of such things, as; "Education, Occupation, Income, Health, Age, Appearance, Hobbies, Spirituality, and Lifestyle". Then each of these values may be combined together to create a single color without losing the critical data that these independent color channels represent and without losing the ability to reserve out that data/channel later.

By this above example, like-minded people would cluster into similar color ranges where people that were described as a certain shade of orange, for example, would have similar views to other shades of orange. The benefit of this system is that it creates a very simple description for some extremely detailed data. It also has the ability to quickly discern who is a neighboring view and who is an opposite view by the relationship of the colors on a color wheel.

In addition, the center of the color wheel may represent one's birth where all color values are at zero and equal to black. As the user grows and gains views, the user moves out into brighter and brighter colors and wider options, with ever the increasing diameter and range of color values available. With these color-coded values from the invention, instead of two people saying that the couple's relationship was likely to fail because their zodiac symbols did not align, one might instead truly have a wealth of supporting data that in fact "Red37s" rarely marry "Blue6s". One's overall value may also be tracked over time to see what path his/her personality has taken over time. For example, data might be found to show that educated blue males tend to drift towards purple after being married for three or more years.

Advertisers would no longer have to describe their advertising campaign as being targeted towards "upwardly mobile baby-boomers who enjoy a digital lifestyle", but perhaps instead as targeted towards "Green33s to Green44s". Furthermore, the rest of the world would have an opportunity to also understand what these "advertising terms" actually mean or represent, because they themselves are either considered a "Green", they are somewhat near "Green", or perhaps they are the complete opposite of "Green". The point is that there would be a system that would allow for relative comparisons that is easy to use and understand. Whereas a system that used symbols for example, such as a "zebra" instead of a color such as "Green" would be more difficult to relate neighboring data. The user would not necessarily know whether a "Zebra" is a neighbor to a "Tiger" like "Greenish-Blue" is a neighboring color to "Green".

These assigned segmentation values can be tracked to help advertisers discover which segment(s) best appreciate their current advertising campaign. These assigned segmentation values may also be used to monitor how changes to a particular advertisement can change its appeal among each segment.

An advantage of the invention is that the user can rank, sort, and tag advertisements. These advertisements may appear in a variety of means, such as: page banners, video clips, audio messages, text, images, and combinations of these formats. On web pages or among those areas where interactive advertising appears, users may help classify these advertisements by "accepting" or "rejecting" them, and/or go deeper with normalized classifications, such as: "offensive", "not-interested", "already have it", "make me a better offer", or "show me more". This data may then be collected and tracked along with the user's assigned segment and/or overall value (see an instance, depicted in FIG. 13 below).

Other users, marketing companies, and advertisers may also use the data in the invention for comparison purposes. The invention would allow advertisers to target only specific segments or go deeper by selecting individual personality traits, or other defining characteristics, such as "a truck-driving Green Bay Packer® fan" from a list of pre-existing known traits.

Figure 13:
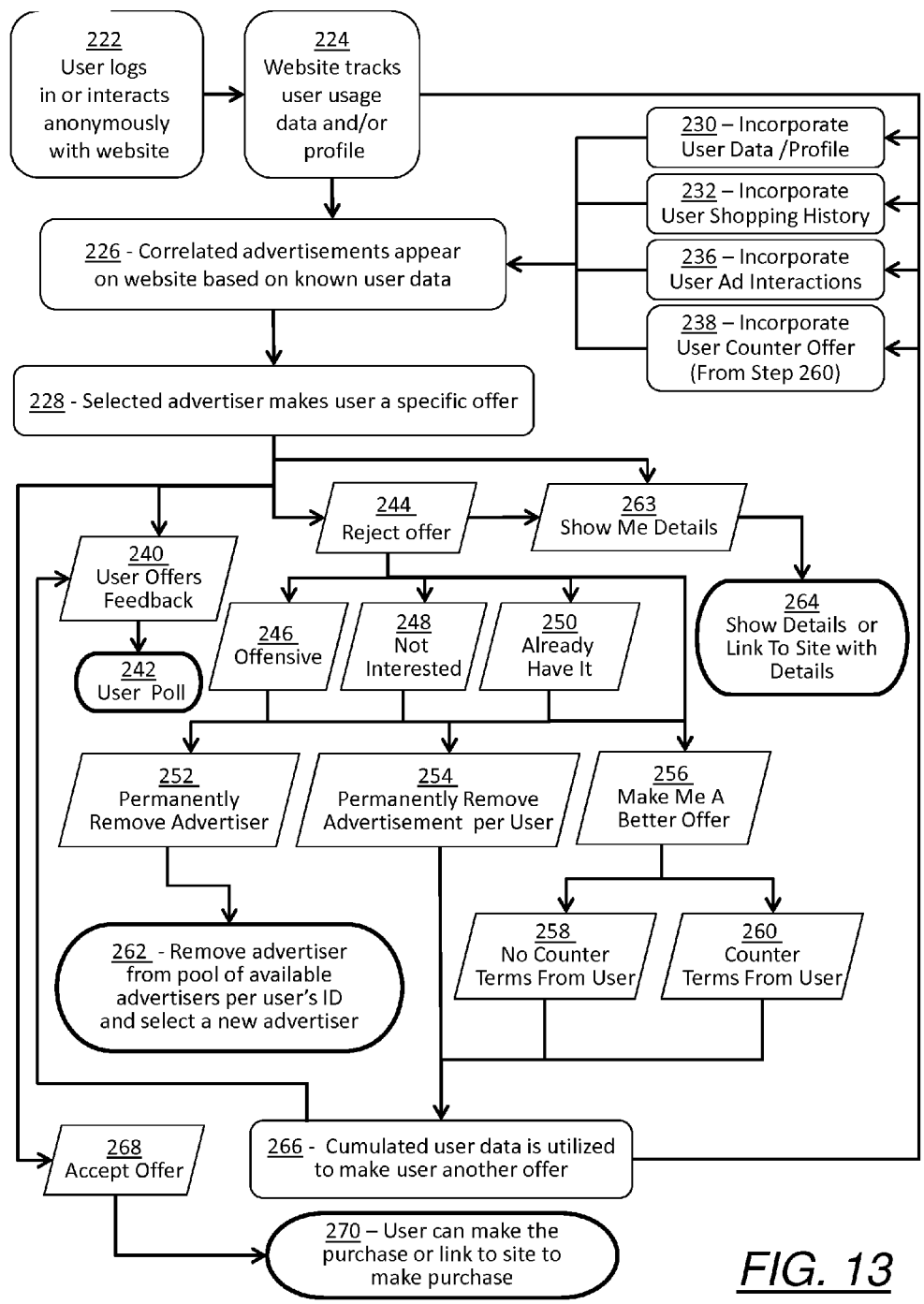
FIG. 13 is a flowchart that depicts an example embodiment of the process by which a user could interact with advertisement offers provided to a particular user from a selected advertiser.

An advantage of the invention is that the user may create a counter offer or determine the acceptable terms with a specific advertiser and/or advertisement where the user may designate such things as: permanently reject all advertisements from this company and/or brand; permanently reject just a particular "advertisement" from this particular company and/or brand; make me, the user, a better offer; and/or the user may define the terms where the user might and/or would accept a deal (also see an instance, depicted in FIG. 13 below).

In cases where the user permanently rejects advertisements from a particular company and/or brand, that designated company and/or brand would no longer have advertisements that appear anywhere within the user's experience or while using the application. This may be based on a cookie stored on the user's computer or based on the user logging into the system.

In cases where the user permanently rejects a particular advertisement, the advertiser may return another advertisement and/or offer based on pre-established rules, e.g. as long as it's an advertisement for a different product. For example, a travel agent may show an advertisement for a trip to a particular city. The user rejects the advertisement, but not the advertiser. So the system returns another advertisement for another travel city.

There may also be benefits or credits provided to the user if they allow a particular advertiser, brand, and/or advertisement to appear during the user's usage of the system. The user may obtain additional benefits or credits by consuming the advertisement with such methods as clicking on the advertisement to read further, watching a video clip, hearing an audio message, giving feedback, or tagging the advertisement with comments.

In cases where the user requests a better offer, the user may designate the user's specific concerns or objections, such as the price, the timeframe to decide or consume, and/or any other specifics of the offer. The user may wait for another offer or specify what terms would be acceptable.

These advertisements may appear totally separate from the user's usage of the system, such as a banner or skyscraper advertisement, and/or these advertisements may appear during a request for information by the user. For example, the user may request information about a particular item such as a request to view a movie trailer for a particular movie, and an advertisement and/or questions from the advertiser may appear before, during, and/or after the information.

The system may then track such information as which advertisers, brands, and/or particular advertisements have been ranked, tagged, sorted, accepted, rejected, rejected permanently, rejected then accepted, along with other relevant information, such as by whom, when, and during what user activity. This information may then be ranked and prioritized with such parameters as selected timeframes, cost ranges, and/or user segments.

FIG. 13 is a flowchart that depicts an example embodiment of the process by which a user could interact with advertisement offers provided to a particular user from a selected advertiser. Starting with a step 222 where a "User logs in or interacts anonymously with website". Followed by a step 224 where the "Website tracks user usage data and/or profile".

In a following step 226 is where a "Correlated advertisements appear on website based on known user data" The step 226 can incorporate a range of data options into the advertisement selection by employing an "Incorporate User Data/Profile" 230 step, an "Incorporate User Shopping History" 232 step, an "Incorporate User Ad Interactions" 236 step, and an "Incorporate User Counter Offer (From Step 260)" step 238.

In a next step 228 is where a "Selected advertiser makes user a specific offer". The specific offer can include an option 240 whereby the "User Offers Feedback" such as the ability to give feedback in a poll. In addition this feedback could be to sort, rank and/or score products/services and/or terms in the offer. In an option 263 is where the user can select a "Show Me Details" whereby the user is directed to a terminator 264 "Show Details or Link To Site with Details" where offer details can appear on the current website or can link the user to another website.

The specific offer could include an option 268 whereby the user can "Accept Offer" provided by the Advertiser. If the user accepts the offer, he/she is sent to a termination 270 whereby the "User can make the purchase or link to site to make purchase".

The specific offer could include an option 244 whereby the user can "Reject Offer" provided by the Advertiser. In addition, the 244 "Reject Offer" can include a range of reasons for the rejection including an "Offensive" 246 option, a "Not Interested" 248 option, an "Already Have It" 250 option, a "Permanently Remove Advertiser" 252 option, a "Permanently Remove Advertisement per User" 254 option, a "Make Me a Better Offer" 256 option, and the "Show Me Details" 263 option.

The "Show Me Details" 263 option advances the user to the terminator 264 whereby a "Show Details or Link to Site with Details" is executed. With the "Offensive" 246 option, the "Not Interested" 248 option, and the "Already Have It" 250 option, the user can go on to also utilize the "Permanently Remove Advertiser" 252 option, the "Permanently Remove Advertisement per User" 254 option, or the "Make Me a Better Offer" 256 option.

With the "Permanently Remove Advertiser" 252 option, the information is sent to a terminator 262 whereby a "Remove advertiser from pool of available advertisers per user's ID and select a new advertiser" function is executed. With the "Permanently Remove Advertisement per User" 254 option, the information is sent to a step 266 whereby an "Advertiser incorporates info to make user another offer".

With the "Make Me a Better Offer" 256 option, the user can go on to also utilize either a "No Counter Terms from User" 258 option or a "Counter Terms from User" 260 option whereby the user can send the advertiser counter terms to the offer and this information is sent to a step 266 whereby an "Advertiser incorporates info to make user another offer". From the step 266, the user utilize the option 268 to "Accept Offer", option 240 the "User Offers Feedback", or the option 244 to "Reject Offer".

One disadvantage of much of the prior art today is that it does not allow users to permanently or even temporarily remove items from future search results. For example, if the user searches a site for hotels in Las Vegas for a particular trip and the user knows up front that there are certain hotels that the user is not interested in, it can then be frustrating every time a search is performed and the same property shows up within the search results/list. This is even more frustrating when it is several properties or items. Perhaps the properties can not be filtered out easily because the user's views for removal have nothing to do with the website's filter capabilities for such things as: price, location, or star rating. The user does not like these hotels for different reasons. An advantage of the invention is that the user can mark those properties/items or remove them to his/her permanent "trash" so that the user never sees them again in any other bin except his/her trash bin.

This feature also applies to favorites. When the user decides on a particular item and wants to find new or related items, it can also become frustrating to see those favorite items over and over again. For example, if the user's searches keep bringing back the same favorite movies in the search results 120a, that the user has already seen, the search system might lose its appeal. However, an advantage of the invention is that as the user moves these popular items to the user's other bins (favs/wish/cart/trash) and these items by default no longer keep appearing in the user's future searches. The user still has a switch that allows him/her to reverse the setting if desired.

With traditional search art, the user typically lacks the ability to set/tag items to no longer appear, not only in that same search again, but any future search. For example, the user decides to move a popular movie found on a shopping site to the user's shopping cart. The next day the user returns and searches the most popular movies and his/her movie comes up within the search. The user goes to the sub-genre of "dramas" and there the movie is again. The invention provides the user the option to keep seeing these same items over and over, as with existing art, or these items can be moved to a bin of the user's own designation, preventing these items from appearing in any future searches (unless the user switches the setting).

In terms of saving information found at a particular website, today people typically try and bookmark the webpage. Thus, there are websites and tools now that allow people to save and share bookmarks. However, this is somewhat inefficient and limiting. When one returns to the bookmarked site it can be difficult to determine what exactly was interesting at the earlier time, especially if the data has moved and/or changed. An advantage of the invention is that the user can use the tracking overlay 32 to collect and tag these individual items.

The tracking overlay 32 operates independently from any concurrently active program, appearing concurrently within the user interface, to collect products, information, and items individually. For example, a user may go to a shopping site for cars and instead of that user being restricted to the search tools and functionality of that site, the user may load and use the tracking overlay 32 on top of that site. The tracking overlay 32 has the ability to recognize images on the web page and resizes itself to surround the individual images on any given page. Then the user can use the symbols found on the tracking overlay 32 that designate a bin classification and that are now familiar to the user to place these images/items into the appropriate bins and/or profiles in the invention databases.

There are several benefits to this system. For one, the user is not limited to comparing items found on one shopping site. The user is free to use as many sites as the tracking overlay 32 recognizes. Now the user has a central repository not just of several bookmarked pages, but of cars from specific websites along with such details as to when the image was saved, the specific URL that it came from, and any additional information the users decided to have added and/or tagged. This also creates a nice fast and efficient way to uniformly search and compare products from different sites by looking at the images in one location verses shifting through bookmarks that may be meaningless, until one takes the time to click on and load each bookmarked page.

The invention thus becomes a central location to collect and sort several items of interest and these items can be sorted visually. All of these items further make up who the user is and what makes the user relative to someone else. If the user needs to buy a gift for someone who is the polar opposite, the user can simply swing the dial to the other side of the color spectrum from one's own value and see what items come up or use the "polar opposite" 120b bins with the social search tools.

As the user searches items, he can also put those items into associated bins with profiles assigned to other people or users, such as his son's "shopping cart" or "wish list". However, this would likely be only from Dad's own perspective and not necessarily directly into his son's own designated "shopping cart" or "wish list" unless they have both prearranged to do so. Meaning that the user can create profiles for other people that the user uses separately from those that other users have personally created for a similar purpose, e.g. a wish list. Together these users can decide whether to share his/her actual bins/profiles or not. If so, the user can then combine the bins/profiles or decide to keep the bins/profile contents separate and use them only for comparison purposes.

For example, dad's number one item on his wish list for his son may not be the number one item found on his son's personal wish list. The benefit of this system is that it keeps track of the two separate viewpoints and can monitor the changes over time in terms of purchases actually made and/or the changing viewpoints/opinions over time. Dad and son, or husband and wife, may track overtime, for example, who is winning the battle of the minds in terms of the most actual purchases made from whose wish list.

The ability to stack variables and then toggle their effects on/off or "switch" them has value well beyond attaching this functionality to the user's profile or social search. As described above, the "switch" capability allows a user to switch an answer to a question that may either have a simple two-sided answer, such as Yes/No or Pro/Against. Clicking the switch button would provide immediate results and reverse the appropriate data/results (also see an instance, depicted in FIG. 11).

In an embodiment, clicking "switch" or perhaps another selected symbol, such as an arrowhead, may provide the user with a drop down list of options. This list of options may be used if there were more than two possible answers to an individual query, such as: "Which cell phone provider do you prefer?" Here the user may have originally selected "Verizon®" and the user may now click on the "switch" or the appropriate arrow symbol that brings down a list, for example, of "Cingular®", "Sprint®" "T-mobile®", or "Other". In another embodiment, the "switch" feature may cycle through these five options (also see an instance, depicted in FIG. 11).

In an embodiment, the user may use similar functionality in a traditional text search, where the user would stack variables and have the ability to temporarily turn on/off or switch variables without having to start the entire search over again. In this case, the "switch" button or drop down option, may return a list of options that were either known as similar or opposite options. For example, the "opposite" of male may be female, but a "similar" list may be: dad, son, husband, brother, boyfriend, male-friend, etc. The similar list for a brand named product may be made up of competing brands associated with the brand name or a list of terms that are most often purchased on a pay-per-word/click system in conjunction with the searched brand name or term searched. With this system the user would determine how the user wanted the search terms broken into individual variables/terms.

Searching for a Verizon® store in the 310 area code that sells BlackBerry® phones using existing text search art may instead create a stack of the four individual terms in four rows using the invention. For example: "Verizon®" on line/row one, "store" on row two, "310" on row three, and "BlackBerrys®" on row four. Here the user may temporarily turn off each variable to see how it affects the total number of results within the search, without having to start the search entirely over. Using the "switch" or a "drop down menu" tool may provide the user with either a list of known opposite values, similar values, or what are currently the next most popular values. So clicking "switch" on "310" for example, may go through other neighboring area codes, and/or prices for similar phones, if the search system did not already know or indicate that "310" meant an "area code".

Accordingly, this disclosure includes the following methods.

Method 1. A method of segmenting information, the method comprising: displaying a at least one topic list; selecting a at least one topic, from said at least one topic list, including a at least one question indicative of said topic; selecting said at least one question, including a plurality of response forms; selecting a response form; and displaying a correlated content to said response form.

Method 2. The method of method 1, including selecting an at least one filter of a plurality of filters.

Method 3. The method of method 1, including displaying a correlated content, opposite to said correlated content to said response form.

Method 4. The method of method 1, including providing an option to remove said at least one question from said selecting a response form of said at least one question.

Method 5. The method of method 1, including providing an option to switch said response form.

Method 6. The method of method 5, wherein said option to switch includes said correlated content.

Method 7. The method of method 1, including displaying a correlated content to said response form according to a priority.

Method 8. The method of method 1, including a tracking overlay, said tracking overlay comprised of a rating panel, including a plurality of rating factors, and a selecting panel, including a plurality of commands, sorting of said correlated content to said response and generating a correlated content.

Method 9. The method of method 8, wherein said sorting correlated content increases content value.

Method 10. The method of method 8, wherein in said sorting of correlated content, optionally, disposes said correlated content from said displaying of correlated content, including an opposite correlated content.

Method 11. The method of method 1, managing an at least one user profile, including comparing said at least one profile with a correlated content.

Method 12. The method of method 11, wherein said at least one user profile is associated with a coding scheme.

Method 13. The method of method 1, including at least one collaborative component.

Method 14. The method of method 1, including displaying a public content.

Method 15. A method of segmenting information, the method comprising: displaying a at least one pre-generated compounded topic, said at least one pre-generated compounded topic generated from a correlated content; selecting a pre-generated compounded topic; and displaying said correlated content.

Method 16. The method of method 15, including selecting an at least one filter of a plurality of filters.

Method 17. The method of method 15, including displaying a correlated content, opposite to said correlated content to said response form.

Method 18. The method of method 15, including displaying a correlated content to said response form according to a priority.

Method 19. The method of method 15, including a tracking overlay, said tracking overlay comprised of a rating panel, including a plurality of rating factors, and a selecting panel, including a plurality of commands, sorting of said correlated content to said response and generating a correlated content.

Method 20. The method of method 19, wherein said sorting correlated content increases content value.

Method 21. The method of method 19, wherein in said sorting of correlated content, optionally, disposes said correlated content from said displaying of correlated content, including an opposite correlated content.

Method 22. The method of method 15, managing an at least one user profile, including comparing said at least one profile with a correlated content.

Method 23. The method of method 22, wherein said at least one user profile is associated with a coding scheme.

Method 24. The method of method 15, including at least one collaborative component.

Method 25. The method of method 15, including displaying a public content.

Accordingly, this disclosure includes the following computer-implemented-systems.

Computer-implemented-system 26. A computer implemented system configured to segment information, the system comprising at least one server computer for communicating with a at least one client computer, comprising: means for displaying a at least one topic list; means for selecting a at least one topic, from said at least one topic list, including a at least one question indicative of said topic; means for selecting said at least one question, including a plurality of response forms; means for selecting a response form; and means for displaying a correlated content to said response form.

Computer-implemented-system 27. The computer implemented system of system 26, including selecting an at least one filter of a plurality of filters.

Computer-implemented-system 28. The computer implemented system of system 26, including displaying a correlated content, opposite to said correlated content to said response form.

Computer-implemented-system 29. The computer implemented system of system 26, including providing an option to remove said at least one question from said selecting a response form of said at least one question.

Computer-implemented-system 30. The computer implemented system of system 26, including providing an option to switch said response form.

Computer-implemented-system 31. The computer implemented system of system 30, wherein said option to switch includes said correlated content.

Computer-implemented-system 32. The computer implemented system of system 26, including displaying a correlated content to said response form according to a priority.

Computer-implemented-system 33. The computer implemented system of system 26, including a tracking overlay, said tracking overlay comprised of a rating panel, including a plurality of rating factors, and a selecting panel, including a plurality of commands, sorting of said correlated content to said response and generating a correlated content.

Computer-implemented-system 34. The computer implemented system of system 33, wherein said sorting correlated content increases content value.

Computer-implemented-system 35. The computer implemented system of system 33, wherein in said sorting of correlated content, optionally, disposes said correlated content from said displaying of correlated content, including an opposite correlated content.

Computer-implemented-system 36. The computer implemented system of system 26, means for managing an at least one user profile, including comparing said at least one profile with a correlated content.

Computer-implemented-system 37. The computer implemented system of system 36, wherein said at least one user profile is associated with a coding scheme.

Computer-implemented-system 38. The computer implemented system of system 26, including at least one collaborative component.

Computer-implemented-system 39. The computer implemented system of system 26, including displaying a public content.

Computer-implemented-system 40. A computer implemented system configured to segment information, the system comprising at least one server computer for communicating with a at least one client computer, comprising: means for displaying a at least one pre-generated compounded topic, said at least one pre-generated compounded topic generated from a correlated content; means for selecting a pre-generated compounded topic; and means for displaying said correlated content.

Computer-implemented-system 41. The computer implemented system of system 40, including selecting an at least one filter of a plurality of filters.

Computer-implemented-system 42. The computer implemented system of system 40, including displaying a correlated content, opposite to said correlated content to said response form.

Computer-implemented-system 43. The computer implemented system of system 40, including displaying a correlated content to said response form according to a priority.

Computer-implemented-system 44. The computer implemented system of system 40, including a tracking overlay, said tracking overlay comprised of a rating panel, including a plurality of rating factors, and a selecting panel, including a plurality of commands, sorting of said correlated content to said response and generating a correlated content.

Computer-implemented-system 45. The computer implemented system of system 44, wherein said sorting correlated content increases content value.

Computer-implemented-system 46. The computer implemented system of system 44, wherein in said sorting of correlated content, optionally, disposes said correlated content from said displaying of correlated content, including an opposite correlated content.

Computer-implemented-system 47. The computer implemented system of system 40, means for managing an at least one user profile, including comparing said at least one profile with a correlated content.

Computer-implemented-system 48. The computer implemented system of system 47, wherein said at least one user profile is associated with a coding scheme.

Computer-implemented-system 49. The computer implemented system of system 40, including at least one collaborative component.

Computer-implemented-system 50. The computer implemented system of system 40, including displaying a public content.

Accordingly, this disclosure includes computer-readable-medium containing instructions and embodied on a tangible medium for controlling a computer, including a memory and at least one processor to perform the following methods.

Computer-readable-medium 51. A computer readable medium containing instructions and embodied on a tangible medium for controlling a computer, including a memory and at least one processor to perform a method of segmenting information, the method comprising: displaying a at least one topic list; selecting a at least one topic, from said at least one topic list, including a at least one question indicative of said topic; selecting said at least one question, including a plurality of response forms; selecting a response form; and displaying a correlated content to said response form.

Computer-readable-medium 52. The computer readable medium of computer-readable-medium 51, including selecting an at least one filter of a plurality of filters.

Computer-readable-medium 53. The computer readable medium of computer-readable-medium 51, including displaying a correlated content, opposite to said correlated content to said response form.

Computer-readable-medium 54. The computer readable medium of computer-readable-medium 51, including providing an option to remove said at least one question from said selecting a response form of said at least one question.

Computer-readable-medium 55. The computer readable medium of computer-readable-medium 51, including providing an option to switch said response form.

Computer-readable-medium 56. The computer readable medium of computer-readable-medium 55, wherein said option to switch includes said correlated content.

Computer-readable-medium 57. The computer readable medium of computer-readable-medium 51, including displaying a correlated content to said response form according to a priority.

Computer-readable-medium 58. The computer readable medium of computer-readable-medium 51, including a tracking overlay, said tracking overlay comprised of a rating panel, including a plurality of rating factors, and a selecting panel, including a plurality of commands, sorting of said correlated content to said response and generating a correlated content.

Computer-readable-medium 59. The computer readable medium of computer-readable-medium 58, wherein said sorting correlated content increases content value.

Computer-readable-medium 60. The computer readable medium of computer-readable-medium 58, wherein in said sorting of correlated content, optionally, disposes said correlated content from said displaying of correlated content, including an opposite correlated content.

Computer-readable-medium 61. The computer readable medium of computer-readable-medium 51, managing an at least one user profile, including comparing said at least one profile with a correlated content.

Computer-readable-medium 62. The computer readable medium of computer-readable-medium 61, wherein said at least one user profile is associated with a coding scheme.

Computer-readable-medium 63. The computer readable medium of computer-readable-medium 51, including at least one collaborative component.

Computer-readable-medium 64. The computer readable medium of computer-readable-medium 51, including displaying a public content.

Computer-readable-medium 65. A computer readable medium containing instructions and embodied on a tangible medium for controlling a computer, including a memory and at least one processor to perform a method of segmenting information, the method comprising: displaying a at least one pre-generated compounded topic, said at least one pre-generated compounded topic generated from a correlated content; selecting a pre-generated compounded topic; and displaying said correlated content.

Computer-readable-medium 66. The computer readable medium of computer-readable-medium 65, including selecting an at least one filter of a plurality of filters.

Computer-readable-medium 67. The computer readable medium of computer-readable-medium 65, including displaying a correlated content, opposite to said correlated content to said response form.

Computer-readable-medium 68. The computer readable medium of computer-readable-medium 65, including displaying a correlated content to said response form according to a priority.

Computer-readable-medium 69. The computer readable medium of computer-readable-medium 65, including a tracking overlay, said tracking overlay comprised of a rating panel, including a plurality of rating factors, and a selecting panel, including a plurality of commands, sorting of said correlated content to said response and generating a correlated content.

Computer-readable-medium 70. The computer readable medium of computer-readable-medium 69, wherein said sorting correlated content increases content value.

Computer-readable-medium 71. The computer readable medium of computer-readable-medium 69, wherein in said sorting of correlated content, optionally, disposes said correlated content from said displaying of correlated content, including an opposite correlated content.

Computer-readable-medium 72. The computer readable medium of computer-readable-medium 65, managing an at least one user profile, including comparing said at least one profile with a correlated content.

Computer-readable-medium 73. The computer readable medium of computer-readable-medium 72, wherein said at least one user profile is associated with a coding scheme.

Computer-readable-medium 74. The computer readable medium of computer-readable-medium 65, including at least one collaborative component.

Computer-readable-medium 75. The computer readable medium of computer-readable-medium 65, including displaying a public content.

Accordingly, this disclosure includes the following methods.

Method 76. A method of gathering data on at least one website, comprising: placing a tracking overlay over data on at least one website, said tracking overlay operating independently from any concurrently active program, appearing concurrently within a user interface, allowing said user to work with said concurrently active program; capturing said data within said tracking overlay, including a plurality of identifying markers of said data from said at least one website; and storing said data, including said plurality of identifying markers within at least one database.

Method 77. The method of method 76, wherein said tracking overlay is comprised of a rating panel, including a plurality of rating factors, and a selecting panel, including a plurality of commands, sorting said data.

Accordingly, this disclosure includes the following computer-implemented-systems.

Computer-implemented-system 78. A computer implemented system that provides gathering data on at least one website, the system comprising at least one server computer for communicating with a at least one client computer, comprising: means for placing a tracking overlay over data on at least one website, said tracking overlay operating independently from any concurrently active program, appearing concurrently within a user interface, allowing said user to work with said concurrently active program; means for capturing said data within said tracking overlay, including a plurality of identifying markers of said data from said at least one website; and means for storing said data, including said plurality of identifying markers within at least one database.

Accordingly, this disclosure includes computer-readable-medium containing instructions and embodied on a tangible medium for controlling a computer, including a memory and at least one processor to perform the following methods.

Computer-readable-medium 79. The computer implemented system of system 78, wherein said tracking overlay is comprised of a rating panel, including a plurality of rating factors, and a selecting panel, including a plurality of commands, sorting said data.

Computer-readable-medium 80. A computer readable medium containing instructions and embodied on a tangible medium for controlling a computer, which includes a memory and at least one processor, to perform a method of gathering data on at least one website, the method comprising: placing a tracking overlay over data on at least one website, said tracking overlay operating independently from any concurrently active program, appearing concurrently within a user interface, allowing said user to work with said concurrently active program; capturing said data within said tracking overlay, including a plurality of identifying markers of said data from said at least one website; and storing said data, including said plurality of identifying markers within at least one database.

Computer-readable-medium 81. The computer readable medium of computer-readable-medium 80, wherein said tracking overlay is comprised of a rating panel, including a plurality of rating factors, and a selecting panel, including a plurality of commands, sorting said data.

Accordingly, this disclosure includes the following methods.

Method 82: A computer-implemented method for correlating information, at least a portion of the method being performed by a computing device comprising at least one processor, the method comprising: storing a response from a first person in a search system, wherein the response is selected from a plurality of options and said response is responsive to a first content; storing a rating from the first person for each of a plurality of content in the search system; electronically displaying the first content and said plurality of options to a user and receiving a user response responsive to the first content from user selected from the plurality of options; and electronically displaying a second content to the user selected by the search system from the first plurality of content through use of the rating for each of the first plurality of content received from the first person based upon a correlation between the response and the user response; and wherein the second content can be displayed to the user without retrieval of a stored URL associated with the second content.

Method 83. The method of method 82 wherein said prompt is a question.

Method 84. The method of method 83 wherein said plurality of responses is a list of answers to said question.

Method 85. The method of method 82 wherein said prompt is a content.

Method 86. The method of method 82 wherein said plurality of responses includes a tag.

Method 87. The method of method 82 wherein said plurality of responses includes a content value.

Method 88. The method of method 82 further comprising the step of displaying an option to remove said prompt and said plurality of responses to said user.

Method 89. The method of method 82 further comprising the step of: displaying said content and a content response to said first user; receiving a first user selection of said content response; and wherein said displaying said content to said second user is also partially based on said first user selection of said content response.

Method 90. The method of method 82 further comprising the step of: receiving a second user selection of said content response; and displaying an updated content to said second user partially based on said second user selection of said content response.

Method 92. The method of method 82 wherein said content is one of movies, music, concerts, television shows, books, games, toys, electronics, restaurants, vehicles, travel, real estate, schools, products, services, stores and/or advertisements.

Method 92. The method of method 82 wherein said content is one of animals, lawyers, doctors, service providers, dates, and/or other users.

Method 93. A computer-implemented method comprising: displaying a prompt and a plurality of responses to a first user; displaying an option to remove said prompt to said first user; receiving a first user selection either of a chosen response selected from said plurality of responses or of said option to remove from said first user; and after receiving a chosen response, generating a content to said first user partially based on said first user selection from said plurality of responses.

Method 94. The method of method 93 further comprising: displaying a prompt and a plurality of responses to a second user; displaying an option to remove said prompt to a second user; and after receiving a chosen response, generating a content to said second user partially based on said first user selection from said plurality of responses.

Method 95. The method of method 93 further comprising displaying an updated prompt and an updated plurality of responses to said first user after receiving said first user selection of said option to remove.

Method 96. The method of method 93 further comprising the step of displaying a sub-prompt and a sub-response to said user after receiving said selection.

Method 97. The method of method 93 wherein said content is generated according to a prior user's correlation of a response and a content.

Method 98. The method of method 93 wherein said content is one of movies, music, concerts, television shows, books, games, toys, electronics, restaurants, vehicles, travel, real estate, schools, products, services, stores and/or advertisements.

Method 99. The method of method 93 wherein said content is one of animals, lawyers, doctors, service providers, dates, and/or other users.

Method 100. A computer-implemented method comprising: displaying a prompt to a first user; receiving a first selection of a response to said prompt from said first user; receiving a first user rating of a content; displaying said prompt to a second user; receiving a second selection of a response to said prompt from said second user; and displaying said content to said second user partially based on correlation between said first selection of a response and said second selection of a response.

Method 101. The method of method 100, wherein said content is displayed according to a priority.

Method 102. A computer-implemented method for correlating information, at least a portion of the method being performed by a computing device comprising at least one processor, the method comprising: storing a response from each person in a first group of persons in a search system, wherein the response is selected from a plurality of options and said response is responsive to a question; storing a rating from each person in the first group of persons for each of a plurality of content in the search system; electronically displaying the question and said plurality of options to a user and receiving a user response responsive to the question from the user selected from the plurality of options; and electronically displaying at least a portion of the plurality of content to the user selected by the search system through use of the rating for each of the first plurality of content received from a matching group of persons within the first group of persons who had an identical response to the question based upon a correlation between the identical response and the user response; wherein the rating for each of the plurality of content does not require storage of an associated URL.

Method 103. The computer-implemented method of method 102, wherein said plurality of content is displayed according to a priority correlated to the rating for each of the plurality of content received from the matching group of persons.

Method 104. The computer-implemented method of method 103, wherein the plurality of content is displayed with an indication of a cumulative rating received from the matching group of persons.

Method 105. The computer-implemented method of method 104, wherein the identical response and the user response are the same.

Method 106. The computer-implemented method of method 105, wherein the identical response and the user response are different.

Method 107. The computer-implemented method of method 100, wherein the identical response and the user response are a complete opposite.

Method 108. The computer-implemented method of method 100, comprising the further steps of: displaying a second question to the first group of persons; receiving a response to the second question from each of the first group of persons; receiving a rating for each of a plurality of content from one or more persons in the first group of persons; electronically displaying the second question to the user of the computer-implemented method; receiving a user response to the second question from the user.

Method 109. The computer-implemented method of method 108, wherein said display is based at least in part upon a correlation between an identical response of a matching group of persons within the first group of persons who had an identical response to the question as the user response to the question as well as an identical response to the second question as the user response to the second question.

Method 110. The computer-implemented method of method 109 wherein the plurality of content is displayed with an indication of a cumulative rating received from the matching group of persons.

Method 111. A computer-implemented method for correlating information, at least a portion of the method being performed by a computing device comprising at least one processor, the method comprising the steps of: electronically storing in a database at least two fields selected from a group of fields comprised of: a first field based upon a first response of a first person to a first content displayed to the first person; a second field based upon a second response of the first person to a second content displayed to the first person; and a third field based upon a characteristic associated with the first person; receiving a client input from a client correlated to at least one field of the group of fields; isolating a first profile correlated to the client input, said first profile comprising at least two correlated fields stored in the database; and displaying a third content to the client that is correlated to the client input; wherein the first the second fields do not require storage of an associated URL; and wherein the third content can be displayed and generated from the database without storage of a URL associated with said third content.

Method 112. The computer-implemented method of method 111, wherein the first response or the second response can comprise an at least one value from the group comprising a ranking value, a rating value, a scoring value, a trashing value, a wish-list value, a purchasing value, a recommendation value, and a count value.

Method 113. The computer-implemented method of method 111, wherein the first response or the second response can comprise an at least one component from the group comprising a temporal component, correlation component, topic component, brand component, hobby component, profile component, social component, polar component, comparison component, threshold component, rationale component, removal component and count component.

Method 114. The computer-implemented method of method 111, wherein the first response or the second response can comprise an at least one correlation from the group comprising the at least one value, the at least one component, the selected fields by the first person, the first or second response by the first person, the first or second displayed content to the first person, the characteristic associated with the first person, the client input, the selected fields by the client, the client, the isolated first profile, the third content displayed to the client, and an isolated second profile comprising at least two correlated fields stored in the database.

Method 115. The computer-implemented method of method 111, wherein the client can comprise an at least one entity from the group comprising the first person, a computing device, a mobile device, a user, an active account, an anonymous user, a third-party, a third-party device, an advertiser, and an advertising account.

Method 116. The computer-implemented method of method 111, wherein the third content correlated to the client input can comprise an at least one content type, category, or genre associated with an at least one item from the group comprising a segmented category, movie, movie on DVD, movie in-theatre, music, book, game, restaurant, travel, college, people-to-date, doctor, lawyer, contractor, product, service, store, retailer, manufacturer, brand, concert, television show, toy, consumer electronic product, cell phone, computer, hardware, tool, shoes, jewelry, furniture, hotel, attorney, car, truck, real estate, dating, event, sports-related, media, entertainment, politics, education, demographic, psychographic, occupation, income, health, appearance, spirituality, religion, lifestyle, hobby, behavior, age, calculated color value, view, preference, taste, interest, family structure, ethnicity, gender, sex, belief, animal view, environmental view, media taste, shopping desire, product purchased, place visited, video clip, audio clip, website, blog application, discussion forum, persistent chat application, shared voice application, shared calendar, shared media library, shared media inventory, shared shopping history, shared document library, selected like-minded people, selected opposite-minded people, price, location, and time.

While certain exemplary embodiments have been described and shown in the accompanying drawings, it is to be understood that such embodiments are merely illustrative and not restrictive of the current invention, and that this invention is not restricted to the specific constructions and arrangements shown and described since modification may occur to those ordinarily skilled in the art.

What is claimed:

1. A processor-implemented method, at least a portion of the method being performed by a computing device comprising at least one processor, the method comprising:
   using at least one active program to generate an electronic display to a user from data obtained from at least one website;
   placing a tracking overlay on the electronic display responsive to a user command, the tracking overlay operating independently from the at least one active program, appearing concurrently within a user interface, allowing the user to work with the at least one active program;
   capturing the data within the tracking overlay, including a plurality of identifying markers of the data obtained from the at least one website; and
   electronically storing the data, including the plurality of identifying markers within at least one database accessible for future use by the user.

2. The method of claim 1, wherein the tracking overlay is comprised of a rating panel, including a plurality of rating factors, and a selecting panel, including a plurality of commands, sorting the data.

3. The method of claim 2, wherein the tracking overlay further comprises recognizing an underlying content in the underlying active program.

4. The method of claim 3, wherein the recognized underlying content comprises a plurality of items, the plurality of items further comprising a plurality of images.

5. The method of claim 4, wherein the plurality of items further comprising a plurality of markers, text strings, characters, meta-data, tags, pricing, temporal information, video, audio, multimedia, correlations, and associated URLs.

6. The method of claim 5, wherein the tracking overlay further comprises isolating an item from the plurality of items.

7. The method of claim 6, wherein the isolating is based in part upon the location of the tracking overlay tool in relation to the plurality of items in the underlying content.

8. The method of claim 7, wherein the tracking overlay further comprises a surrounding of the isolated item from the plurality of items in the underlying content.

9. The method of claim 8, wherein the surrounding of the isolated item includes resizing the tracking overlay according to the isolated underlying content.

10. The method of claim 9, wherein the surrounded and isolated item receives a rating using the rating panel, included in the plurality of rating factors.

11. The method of claim 10, wherein the rated isolated item using the rating panel includes a classification using the plurality of commands, sorting the data.

12. The method of claim 11, wherein the rated isolated item using the rating panel includes a tagging.

13. A non-transitory machine-readable medium containing processor-executable instructions and embodied on the non-transitory machine-readable medium for controlling a computer, which includes a memory and at least one processor, to perform a method of using at least one active program to generate an electronic display to a user from data obtained from at least one website, the method comprising:
   placing a tracking overlay on electronic display responsive to a user command, the tracking overlay operating independently from the at least one active program, appearing concurrently within a user interface, allowing the user to work with the at least one active program;

capturing the data within the tracking overlay, including a plurality of identifying markers of the data obtained from the at least one website; and electronically storing the data, including the plurality of identifying markers within at least one database accessible for future use by the user.

14. The computer readable medium of claim 13, wherein the tracking overlay is comprised of a rating panel, including a plurality of rating factors, and a selecting panel, including a plurality of commands, sorting the data.

15. The computer readable medium of claim 14, wherein the tracking overlay further comprises recognizing an underlying content in the underlying active program.

16. The computer readable medium of claim 15, wherein the recognized underlying content comprises a plurality of items, the plurality of items further comprising a plurality of images.

17. The computer readable medium of claim 16, wherein the plurality of items further comprising a plurality of markers, text strings, characters, meta-data, tags, pricing, temporal information, video, audio, multimedia, correlations, and associated URLs.

18. The computer readable medium of claim 17, wherein the tracking overlay further comprises isolating an item from the plurality of items.

19. A processor-implemented method, at least a portion of the method being performed by a computing device comprising at least one processor, the method comprising:

using at least one active program within a web browser to generate an electronic display to a user from data obtained from at least one website;

placing a tracking overlay on the electronic display responsive to a user command, the tracking overlay operating independently from the at least one active program, appearing concurrently within a user interface, allowing the user to work with the at least one active program;

capturing the data within the tracking overlay, including a plurality of identifying markers of the data obtained from the at least one website; and electronically storing the data, including the plurality of identifying markers within at least one database accessible for future use by the user.

20. The method of claim 19, wherein the at least one database accessible for future use by the user includes a group comprising a content server, a profile server, and a client device.

* * * * *